(12) United States Patent
Bunandar et al.

(10) Patent No.: US 11,209,856 B2
(45) Date of Patent: Dec. 28, 2021

(54) PATH-NUMBER-BALANCED UNIVERSAL PHOTONIC NETWORK

(71) Applicant: Lightmatter, Inc., Boston, MA (US)

(72) Inventors: Darius Bunandar, Boston, MA (US); Martin B. Z. Forsythe, Jamaica Plain, MA (US); Michael Gould, Boston, MA (US); Tomo Lazovich, Cambridge, MA (US)

(73) Assignee: Lightmatter, Inc., Boston, MA (US)

( * ) Notice: Subject to any disclaimer, the term of this patent is extended or adjusted under 35 U.S.C. 154(b) by 132 days.

(21) Appl. No.: 16/799,153

(22) Filed: Feb. 24, 2020

(65) Prior Publication Data

US 2020/0272195 A1    Aug. 27, 2020

Related U.S. Application Data

(60) Provisional application No. 62/810,105, filed on Feb. 25, 2019.

(51) Int. Cl.
*G06E 1/04* (2006.01)

(52) U.S. Cl.
CPC .................... *G06E 1/045* (2013.01)

(58) Field of Classification Search
CPC ....................................... G06E 1/045
USPC ................................. 359/107, 108
See application file for complete search history.

(56) References Cited

U.S. PATENT DOCUMENTS

| | | | |
|---|---|---|---|
| 3,872,293 A | 3/1975 | Green | |
| 4,567,569 A | 1/1986 | Caulfield et al. | |
| 4,607,344 A | 8/1986 | Athale et al. | |
| 4,633,428 A | 12/1986 | Byron | |
| 4,686,646 A | 8/1987 | Goutzoulis | |
| 4,739,520 A | 4/1988 | Collins, Jr. et al. | |
| 4,809,204 A | 2/1989 | Dagenais et al. | |
| 4,849,940 A | 7/1989 | Marks, II et al. | |
| 4,877,297 A | 10/1989 | Yeh | |
| 4,948,212 A | 8/1990 | Cheng et al. | |

(Continued)

FOREIGN PATENT DOCUMENTS

| | | |
|---|---|---|
| CN | 101630178 A | 1/2010 |
| WO | 2005/029404 A2 | 3/2005 |

(Continued)

OTHER PUBLICATIONS

International Search Report and Written Opinion in connection with International Application No. PCT/US2020/019450, dated Jun. 23, 2020.

(Continued)

*Primary Examiner* — Collin X Beatty
(74) *Attorney, Agent, or Firm* — Wolf, Greenfield & Sacks, P.C.

(57) ABSTRACT

Systems and methods for performing matrix operations using a path-number balanced optical network are provided. The optical network is formed as an array including active optical components and passive optical components arranged at a substantially central location of the array. The optical network includes at least NM active optical components which are used to implement a first matrix of any size N×M by embedding the first matrix in a second matrix of a larger size. The optical network performs matrix-vector and matrix-matrix operations by propagating one or more pluralities of optical signals corresponding to an input vector through the optical network.

14 Claims, 13 Drawing Sheets

(56) References Cited

U.S. PATENT DOCUMENTS

| | | | |
|---|---|---|---|
| 5,004,309 A | 4/1991 | Caulfield et al. | |
| 5,077,619 A | 12/1991 | Toms | |
| 5,095,459 A | 3/1992 | Ohta et al. | |
| 5,333,117 A | 7/1994 | Ha et al. | |
| 5,383,042 A | 1/1995 | Robinson | |
| 5,394,257 A | 2/1995 | Horan et al. | |
| 5,428,711 A | 6/1995 | Akiyama et al. | |
| 5,495,356 A | 2/1996 | Sharony et al. | |
| 5,576,873 A | 11/1996 | Crossland et al. | |
| 5,640,261 A | 6/1997 | Ono | |
| 5,699,449 A | 12/1997 | Javidi | |
| 5,784,309 A | 7/1998 | Budil | |
| 5,953,143 A | 9/1999 | Sharony et al. | |
| 6,005,998 A | 12/1999 | Lee | |
| 6,060,710 A | 5/2000 | Carrieri et al. | |
| 6,178,020 B1 | 1/2001 | Schultz et al. | |
| 6,408,120 B1 | 6/2002 | Dautartas | |
| 6,728,434 B2 | 4/2004 | Flanders | |
| 7,136,587 B1 | 11/2006 | Davis et al. | |
| 7,173,272 B2 | 2/2007 | Ralph | |
| 7,536,431 B2 | 5/2009 | Goren et al. | |
| 7,660,533 B1 | 2/2010 | Meyers et al. | |
| 7,876,248 B2 | 1/2011 | Berkley et al. | |
| 7,985,965 B2 | 7/2011 | Barker et al. | |
| 8,018,244 B2 | 9/2011 | Berkley | |
| 8,023,828 B2 | 9/2011 | Beausoleil et al. | |
| 8,026,837 B1 | 9/2011 | Valley et al. | |
| 8,027,587 B1 | 9/2011 | Watts | |
| 8,035,540 B2 | 10/2011 | Berkley et al. | |
| 8,129,670 B2 | 3/2012 | Laycock et al. | |
| 8,190,553 B2 | 5/2012 | Routt | |
| 8,223,414 B2 | 7/2012 | Goto | |
| 8,386,899 B2 | 2/2013 | Goto et al. | |
| 8,560,282 B2 | 10/2013 | Macready et al. | |
| 8,604,944 B2 | 12/2013 | Berkley et al. | |
| 8,620,855 B2 | 12/2013 | Bonderson | |
| 8,837,544 B2 | 9/2014 | Santori | |
| 9,009,560 B1 | 4/2015 | Matache et al. | |
| 9,250,391 B2 | 2/2016 | McLaughlin et al. | |
| 9,354,039 B2 | 5/2016 | Mower et al. | |
| 9,513,276 B2 | 12/2016 | Tearney et al. | |
| 9,791,258 B2 | 10/2017 | Mower | |
| 10,009,135 B2 | 6/2018 | Tait et al. | |
| 10,095,262 B2 | 10/2018 | Valley et al. | |
| 10,197,971 B1 | 2/2019 | Horst | |
| 10,268,232 B2 | 4/2019 | Harris et al. | |
| 10,359,272 B2 | 7/2019 | Mower et al. | |
| 10,382,139 B2 | 8/2019 | Rosenhouse et al. | |
| 10,608,663 B2 | 3/2020 | Gould et al. | |
| 10,670,860 B2 | 6/2020 | Tait et al. | |
| 2003/0086138 A1 | 5/2003 | Pittman et al. | |
| 2003/0235363 A1 | 12/2003 | Pfeiffer | |
| 2003/0235413 A1 | 12/2003 | Cohen et al. | |
| 2004/0243657 A1 | 12/2004 | Goren et al. | |
| 2005/0036786 A1 | 2/2005 | Ramachandran et al. | |
| 2005/0100345 A1 | 5/2005 | Welch et al. | |
| 2006/0215949 A1 | 9/2006 | Lipson et al. | |
| 2007/0180586 A1 | 8/2007 | Amin | |
| 2008/0031566 A1 | 2/2008 | Matsubara et al. | |
| 2008/0212186 A1 | 9/2008 | Zoller et al. | |
| 2008/0212980 A1 | 9/2008 | Weiner | |
| 2008/0273835 A1 | 11/2008 | Popovic | |
| 2008/0279105 A1 | 11/2008 | Absillis et al. | |
| 2009/0028554 A1 | 1/2009 | Anderson et al. | |
| 2010/0165432 A1 | 7/2010 | Laycock et al. | |
| 2010/0215365 A1 | 8/2010 | Fukuchi | |
| 2013/0011093 A1 | 1/2013 | Goh et al. | |
| 2013/0121706 A1 | 5/2013 | Yang et al. | |
| 2014/0003761 A1 | 1/2014 | Dong | |
| 2014/0056585 A1 | 2/2014 | Qian et al. | |
| 2014/0241657 A1 | 8/2014 | Manouvrier | |
| 2014/0299743 A1 | 10/2014 | Miller | |
| 2015/0354938 A1 | 12/2015 | Mower et al. | |
| 2015/0382089 A1 | 12/2015 | Mazed | |
| 2016/0103281 A1 | 4/2016 | Matsumoto | |
| 2016/0112129 A1 | 4/2016 | Chang | |
| 2016/0118106 A1 | 4/2016 | Yoshimura et al. | |
| 2016/0162781 A1 | 6/2016 | Lillicrap et al. | |
| 2016/0162798 A1 | 6/2016 | Marandi et al. | |
| 2016/0182155 A1 | 6/2016 | Taylor et al. | |
| 2016/0245639 A1 | 8/2016 | Mower et al. | |
| 2016/0301478 A1 | 10/2016 | Luo et al. | |
| 2016/0315697 A1 | 10/2016 | Breukelaar et al. | |
| 2016/0352515 A1 | 12/2016 | Bunandar et al. | |
| 2017/0031101 A1 | 2/2017 | Miller | |
| 2017/0201813 A1 | 7/2017 | Sahni | |
| 2017/0237505 A1 | 8/2017 | Lucamarini et al. | |
| 2017/0285373 A1 | 10/2017 | Zhang et al. | |
| 2017/0351293 A1 | 12/2017 | Carolan et al. | |
| 2018/0107237 A1 | 4/2018 | Andregg et al. | |
| 2018/0274900 A1 | 9/2018 | Mower et al. | |
| 2018/0323825 A1 | 11/2018 | Cioffi et al. | |
| 2018/0335574 A1 | 11/2018 | Steinbrecher et al. | |
| 2019/0110084 A1 | 4/2019 | Jia et al. | |
| 2019/0331912 A1 | 10/2019 | Tait et al. | |
| 2019/0346685 A1 | 11/2019 | Miller | |
| 2019/0354894 A1 | 11/2019 | Lazovich et al. | |
| 2019/0356394 A1 | 11/2019 | Bunandar et al. | |
| 2019/0370644 A1 | 12/2019 | Kenney et al. | |
| 2019/0372589 A1 | 12/2019 | Gould et al. | |
| 2020/0396007 A1 | 12/2020 | Bunandar et al. | |

FOREIGN PATENT DOCUMENTS

| | | |
|---|---|---|
| WO | 2006/023067 A2 | 3/2006 |
| WO | 2008/069490 A1 | 6/2008 |
| WO | 2018/098230 A1 | 5/2018 |
| WO | 2019/217835 A1 | 11/2019 |

OTHER PUBLICATIONS

Harris et al., Linear programmable nanophotonic processors. Optica. 2018;12(5):1623-1631.

Murdocca et al., Optical design of programmable logic arrays. Applied Optics. 1988;27(9):1651-1660.

U.S. Appl. No. 16/412,098, filed May 14, 2019, Bunandar et al.

PCT/US2015/034500, Mar. 15, 2016, International Search Report and Written Opinion.

PCT/US19/32181, Jul. 23, 2019, Invitation to Pay Additional Fees.

PCT/US19/32181, Sep. 23, 2019, International Search Report and Written Opinion.

PCT/US2019/032272, Jun. 27, 2019, Invitation to Pay Additional Fees.

PCT/US2019/032272, Sep. 4, 2019, International Search Report and Written Opinion.

PCT/US2020/019450, Apr. 17, 2020, Invitation to Pay Additional Fees.

International Preliminary Report on Patentability for International Application No. PCT/US2019/032272 dated Dec. 17, 2020.

International Preliminary Report on Patentability dated Nov. 26, 2020 in connection with International Application No. PCT/US2019/032181.

International Search Report and Written Opinion for International Application No. PCT/US19/32181 dated Sep. 23, 2019.

International Search Report and Written Opinion for International Application No. PCT/US2019/032272 dated Sep. 4, 2019.

International Search Report and Written Opinion from International Application No. PCT/US2015/034500, dated Mar. 15, 2016, 7 pages.

Invitation to Pay Additional Fees for International Application No. PCT/US19/32181 dated Jul. 23, 2019.

Invitation to Pay Additional Fees for International Application No. PCT/US2019/032272 dated Jun. 27, 2019.

Invitation to Pay Additional Fees for International Application No. PCT/US2020/019450 dated Apr. 17, 2020.

[No Author Listed], Optical Coherent Receiver Analysis. 2009 Optiwave Systems, Inc. 16 pages. URL:https://dru5cjyjifvrg.cloudfront.net/wp-content/uploads/2017/03/OptiSystem-Applications-Coherent-Receiver-Analysis.pdf [retrieved on Aug. 17, 2019].

(56) References Cited

OTHER PUBLICATIONS

Aaronson et al., Computational complexity of linear optics. Proceedings of the 43rd Annual ACM Symposium on Theory of Computing. 2011. 101 pages. ISBN 978-1-4503-0691-1.

Abu-Mostafa et al., Optical neural computers. Scientific American. 1987:88-95.

Albert et al., Statistical mechanics of com-plex networks. Reviews of Modern Physics. 2002;(74):47-97.

Almeida et al., All-optical control of light on a silicon chip. Nature. 2004;431:1081-1084.

Amir et al., Classical diffusion of a quantum particle in a noisy environment. Physical Review E. 2009;79. 5 pages. DOI: 10.1103/PhysRevE.79.050105.

Amit et al., Spin-glass models of neural networks. Physical Review A. 1985;32(2):1007-1018.

Anitha et al., Comparative Study of High performance Braun's multiplier using FPGAs. IOSR Journal of Electrontrics and Communication Engineering (IOSRJECE). 2012;1:33-37.

Appeltant et al., Information processing using a single dynamical node as complex system. Nature Communications. 2011. 6 pages. DOI: 10.1038/ncomms1476.

Arjovsky et al., Unitary Evolution Recurrent Neural Networks. arXiv:1511.06464. 2016. 9 pages.

Aspuru-Guzik et al., Photonic quantum simulators. Nature Physics. 2012;8:285-291. DOI: 10.1038/NPHYS2253.

Aspuru-Guzik et al., Simulated Quantum Computation of Molecular Energies. Science. 2005;309:1704-7.

Atabaki et al., Integrating photonics with silicon nanoelectronics for the next generation of systems on a chip. Nature. 2018;556(7701):349-354. 10 pages. DOI: 10.1038/s41586-018-0028-z.

Baehr-Jones et al., A 25 Gb/s Silicon Photonics Platform. arXiv:1203.0767. 2012. 11 pages.

Bao et al., Atomic-Layer Graphene as a Saturable Absorber for Ultrafast Pulsed Lasers. 24 pages. 2009.

Bao et al., Monolayer graphene as a saturable absorber in a mode-locked laser. Nano Research. 2011;4:297-307. DOI: 10.1007/s12274-010-0082-9.

Barahona, On the computational complexity of Ising spin glass models. Journal of Physics A: Mathematical and General. 1982;15:3241-3253.

Bertsimas et al., Robust optimization with simulated annealing. Journal of Global Optimization. 2010;48:323-334. DOI 10.1007/s10898-009-9496-x.

Bewick, Fast multiplication: algorithms and implementation. Ph.D. thesis, Stanford University (1994). 170 pages.

Bonneau et al., Quantum interference and manipulation of entanglement in silicon wire waveguide quantum circuits. New Journal of Physics. 2012;14:045003. 13 pages. DOI: 10.1088/1367-2630/14/4/045003.

Brilliantov, Effective magnetic Hamiltonian and Ginzburg criterion for fluids. Physical Review E. 1998;58:2628-2631.

Bromberg et al., Bloch oscillations of path-entangled photons. Physical Review Letters. 2010;105:263604-1-2633604-4. 4 pages. DOI: 10.1103/PhysRevLett.105.263604.

Bromberg et al., Quantum and Classical Correlations in Waveguide Lattices. Physical Review Letters. 2009;102:253904-1-253904-4. 4 pages. DOI: 10.1103/PhysRevLett.102.253904.

Broome et al., Photonic Boson Sampling in a Tunable Circuit. Science. 2012;339:794-8.

Bruck et al., On the power of neural networks for solving hard problems. American Institute of Physics. 1988. pp. 137-143. 7 pages.

Burgwal et al., Using an imperfect photonic network to implement random unitaries. Optics Express. 2017;25(23):28236-28245.

Canziani et al., Evaluation of neural network architectures for embedded systems. Circuits and Systems (ISCAS). 2017 IEEE International Symposium. 4 pages.

Cardenas et al., Low loss etchless silicon photonic waveguides. Optics Express. 2009;17(6):4752-4757.

Carolan et al., Universal linear optics. Science. 2015;349:711-716.

Caves, Quantum-mechanical noise in an interferometer. Physical Review D. 1981;23(8):1693-1708. 16 pages.

Centeno et al., Optical bistability in finite-size nonlinear bidimensional photonic crystals doped by a microcavity. Physical Review B. 2000;62(12):R7683-R7686.

Chan, Optical flow switching networks. Proceedings of the IEEE. 2012;100(5):1079-1091.

Chen et al., Compact, low-loss and low-power 8x8 broadband silicon optical switch. Optics Express. 2012;20(17):18977-18985.

Chen et al., DianNao: A small-footprint high-throughput accelerator for ubiquitous machine-learning. ACM Sigplan Notices. 2014;49:269-283.

Chen et al., Efficient photon pair sources based on silicon-on-insulator microresonators. Proc. of SPIE. 2010;7815. 10 pages.

Chen et al., Frequency-bin entangled comb of photon pairs from a Silicon-on-Insulator micro-resonator. Optics Express. 2011;19(2):1470-1483.

Chen et al., Universal method for constructing N-port nonblocking optical router based on 2x2 optical switch for photonic networks-on-chip. Optics Express. 2014;22(10);12614-12627. DOI: 10.1364/OE.22.012614.

Cheng et al., In-Plane Optical Absorption and Free Carrier Absorption in Graphene-on-Silicon Waveguides. IEEE Journal of Selected Topics in Quantum Electronics. 2014;20(1). 6 pages.

Chetlur et al., cuDNN: Efficient primitives for deep learning. arXiv preprint arXiv:1410.0759.2014. 9 pages.

Childs et al., Spatial search by quantum walk. Physical Review A. 2004;70(2):022314. 11 pages.

Chung et al., A monolithically integrated large-scale optical phased array in silicon-on-insulator emos. IEEE Journal of Solid-State Circuits. 2018;53:275-296.

Cincotti, Prospects on planar quantum computing. Journal of Lightwave Technology. 2009;27(24):5755-5766.

Clements et al., Optimal design for universal multiport interferometers. Optica. 2016;3(12):1460-1465.

Crespi et al., Integrated multimode interferometers with arbitrary designs for photonic boson sampling. Nature Photonics. 2013;7:545-549. DOI: 10.1038/NPHOTON.2013.112.

Crespi, et al., Anderson localization of entangled photons in an integrated quantum walk. Nature Photonics. 2013;7:322-328. DOI: 10.1038/NPHOTON.2013.26.

Dai et al., Novel concept for ultracompact polarization splitter-rotator based on silicon nanowires. Optics Express. 2011;19(11):10940-9.

Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.

Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.

Esser et al., Convolutional networks for fast, energy-efficient neuromorphic computing. Proceedings of the National Academy of Sciences. 2016:113(41):11441-11446.

Farhat et al., Optical implementation of the Hopfield model. Applied Optics. 1985;24(10):1469-1475.

Feinberg et al., Making memristive neural network accelerators reliable. IEEE International Symposium on High Performance Computer Architecture (HPCA). 2018. pp. 52-65. DOI 10.1109/HPCA.2018.00015.

Fushman et al., Controlled Phase Shifts with a Single Quantum Dot. Science. 2008;320:769-772. DOI: 10.1126/science.1154643.

George et al., A programmable and configurable mixed-mode FPAA SoC. IEEE Transactions on Very Large Scale Integration (VLSI) Systems. 2016;24:2253-2261.

Gilmer et al., Neural message passing for quantum chemistry. arXiv preprint arXiv:1704.01212. Jun. 2017. 14 pages.

Golub et al., Calculating the singular values and pseudo-inverse of a matrix. Journal of the Society for Industrial and Applied Mathematics Series B Numerical Analysis. 1965;2(2):205-224.

(56) References Cited

OTHER PUBLICATIONS

Graves et al., Hybrid computing using a neural network with dynamic external memory. Nature. 2016;538. 21 pages. DOI:10.1038/nature20101.

Grote et al., First long-term application of squeezed states of light in a gravitational-wave observatory. Physical Review Letter. 2013;110:181101. 5 pages. DOI: 10.1103/PhysRevLett.110.181101.

Gruber et al., Planar-integrated optical vector-matrix multiplier. Applied Optics. 2000;39(29):5367-5373.

Gullans et al., Single-Photon Nonlinear Optics with Graphene Plasmons. Physical Review Letter. 2013;111:247401-1-247401-5. DOI: 10.1103/PhysRevLett.111.247401.

Gunn, CMOS photonics for high-speed interconnects. IEEE Micro. 2006;26:58-66.

Haffner et al., Low-loss plasmon-assisted electro-optic modulator. Nature. 2018;556:483-486. 17 pages. DOI: 10.1038/s41586-018-0031-4.

Halasz et al., Phase diagram of QCD. Physical Review D. 1998;58:096007. 11 pages.

Hamerly et al., Scaling advantages of all-to-all connectivity in physical annealers: the Coherent Ising Machine vs. D-Wave 2000Q. arXiv preprints, May 2018. 17 pages.

Harris et al. Efficient, Compact and Low Loss Thermo-Optic Phase Shifter in Silicon. Optics Express. 2014;22(9);10487-93. DOI:10.1364/OE.22.010487.

Harris et al., Bosonic transport simulations in a large-scale programmable nanophotonic processor. arXiv:1507.03406. 2015. 8 pages.

Harris et al., Integrated source of spectrally filtered correlated photons for large-scale quantum photonic systems. Physical Review X. 2014;4:041047. 10 pages. DOI: 10.1103/PhysRevX.4.041047.

Harris et al., Quantum transport simulations in a programmable nanophotonic processor. Nature Photonics. 2017;11:447-452. DOI: 10.1038/NPHOTON.2017.95.

Hinton et al., Reducing the dimensionality of data with neural networks. Science. 2006;313:504-507.

Hochberg et al., Silicon Photonics: The Next Fabless Semiconductor Industry. IEEE Solid-State Circuits Magazine. 2013. pp. 48-58. DOI: 10.1109/MSSC.2012.2232791.

Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.

Hong et al., Measurement of subpicosecond time intervals between two photons by interference. Physical Review Letters. 1987;59(18):2044-2046.

Hopfield et al., Neural computation of decisions in optimization problems. Biological Cybernetics. 1985;52;141-152.

Hopfield, Neural networks and physical systems with emergent collective computational abilities. PNAS. 1982;79:2554-2558. DOI: 10.1073/pnas.79.8.2554.

Horowitz, Computing's energy problem (and what we can do about it). Solid-State Circuits Conference Digest of Technical Papers (ISSCC), 2014 IEEE International. 5 pages.

Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.

Humphreys et al., Linear Optical Quantum Computing in a Single Spatial Mode. Physical Review Letters. 2013;111:150501. 5 pages. DOI: 10.1103/PhysRevLett.111.150501.

Inagaki et al., Large-scale ising spin network based on degenerate optical parametric oscillators. Nature Photonics. 2016;10:415-419. 6 pages. DOI: 10.1038/NPHOTON.2016.68.

Isichenko, Percolation, statistical topography, and trans-port in random media. Reviews of Modern Physics. 1992;64(4):961-1043.

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated waveguides for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al., In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

Kardar et al., Dynamic Scaling of Growing Interfaces. Physical Review Letters. 1986;56(9):889-892.

Karpathy, CS231n Convolutional Neural Networks for Visual Recognition. Class notes. 2019. URL:http://cs231n.github.io/ 2 pages, [last accessed Sep. 24, 2019].

Kartalopoulos, Part III Coding Optical Information. Introduction to DWDM Technology. IEEE Press. 2000. pp. 165-166.

Keckler et al., GPUs and the future of parallel computing. IEEE Micro. 2011;31:7-17. DOI: 10.1109/MM.2011.89.

Kteling et al., On photonic Controlled Phase Gates. New Journal of Physics. 2010;12:0133003. 17 pages. DOI: 10.1088/1367-2630/12/1/013003.

Kilper et al., Optical networks come of age. Optics Photonics News. 2014;25:50-57. DOI: 10.1364/OPN.25.9.000050.

Kim et al., A functional hybrid memristor crossbar-array/cmos system for data storage and neuromorphic applications. Nano Letters. 2011;12:389-395.

Kirkpatrick et al., Optimization by simulated annealing. Science. 1983;220(4598):671-680.

Knill et al., A scheme for efficient quantum computation with linear optics. Nature. 2001;409(4652):46-52.

Knill et al., The Bayesian brain: the role of uncertainty in neural coding and computation. Trends in Neurosciences. 2004;27(12):712-719.

Knill, Quantum computing with realistically noisy devices. Nature. 2005;434:39-44.

Kok et al., Linear optical quantum computing with photonic qubits. Reviews of Modern Physics. 2007;79(1):135-174.

Koos et al., Silicon-organic hybrid (SOH) and plasmonic-organic hybrid (POH) integration. Journal of Lightwave Technology. 2016;34(2):256-268.

Krizhevsky et al., ImageNet classification with deep convolutional neural networks. Advances in Neural Information Processing Systems (NIPS). 2012. 9 pages.

Kucherenko et al., Application of Deterministic Low-Discrepancy Sequences in Global Optimization. Computational Optimization and Applications. 2005;30:297-318.

Kwack et al., Monolithic InP strictly non-blocking 8x8 switch for high-speed WDM optical interconnection. Optics Express. 2012;20(27):28734-41.

Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.

Lahini et al., Quantum Correlations in Two-Particle Anderson Localization. Physical Review Letters. 2010;105:163905. 4 pages. DOI: 10.1103/PhysRevLett.105.163905.

Laing et al., High-fidelity operation of quantum photonic circuits. Applied Physics Letters. 2010;97:211109. 5 pages. DOI: 10.1063/1.3497087.

Landauer, Irreversibility and heat generation in the computing process. IBM Journal of Research and Development. 1961. pp. 183-191.

Lanyon et al., Towards quantum chemistry on a quantum computer. Nature Chemistry. 2010;2:106-10. DOI: 10.1038/NCHEM.483.

(56) References Cited

OTHER PUBLICATIONS

Lawson et al., Basic linear algebra subprograms for Fortran usage. ACM Transactions on Mathematical Software (TOMS). 1979;5(3):308-323.

Lecun et al., Deep learning. Nature. 2015;521:436-444. DOI:10.1038/nature14539.

Lecun et al., Gradient-based learning applied to document recognition. Proceedings of the IEEE. Nov. 1998. 46 pages.

Levi et al., Hyper-transport of light and stochastic acceleration by evolving disorder. Nature Physics. 2012;8:912-7. DOI: 10.1038/NPHYS2463.

Li et al., Efficient and self-adaptive in-situ learning in multilayer memristor neural networks. Nature Communications. 2018;9:2385. 8 pages, doi: 10.1038/s41467-018-04484-2.

Lin et al., All-optical machine learning using diffractive deep neural networks. Science. 2018;361:1004-1008. 6 pages. doi: 10.1126/science.aat8084.

Little, The existence of persistent states in the brain. Mathematical Biosciences. 1974;19:101-120.

Liu et al., Towards 1-Tb/s Per-Channel Optical Transmission Based on Multi-Carrier Modulation. 19th Annual Wireless and Optical Communications Conference. May 2010. 4 pages. DOI: 10.1109/WOCC.2010.5510630.

Lu et al., 16 x 16 non-blocking silicon optical switch based on electro-optic Mach-Zehnder interferometers. Optics Express. 2016:24(9):9295-9307. doi: 10.1364/OE.24.009295.

Ma et al., Optical switching technology comparison: Optical mems vs. Other technologies. IEEE Optical Communications. 2003;41(11):S16-S23.

Macready et al., Criticality and Parallelism in Combinatorial Optimization. Science. 1996;271:56-59.

Marandi et al., Network of time-multiplexed optical parametric oscillators as a coherent Ising machine. Nature Photonics. 2014;8:937-942. doi: 10.1038/NPHOTON.2014.249.

Martin-Lopez et al., Experimental realization of Shor's quantum factoring algorithm using qubit recycling. Nature Photonics. 2012;6:773-6. DOI: 10.1038/NPHOTON.2012.259.

McMahon et al., A fully programmable 100-spin coherent Ising machine with all-to-all connections. Science. 2016;354(6312):614-7. DOI: 10.1126/science.aah5178.

Mead, Neuromorphic electronic systems. Proceedings of the IEEE. 1990;78(10):1629-1636.

Migdall et al., Tailoring single-photon and multiphoton probabilities of a single-photon on-demand source. Physical Review A. 2002;66:053805. 4 pages. DOI: 10.1103/PhysRevA.66.053805.

Mikkelsen et al., Dimensional variation tolerant silicon-on-insulator directional couplers. Optics Express. 2014;22(3):3145-50. DOI:10.1364/OE.22.003145.

Miller, Are optical transistors the logical next step? Nature Photonics. 2010;4:3-5.

Miller, Attojoule optoelectronics for low-energy information processing and communications. Journal of Lightwave Technology. 2017;35(3):346-96. DOI: 10.1109/JLT.2017.2647779.

Miller, Energy consumption in optical modulators for interconnects. Optics Express. 2012;20(S2):A293-A308.

Miller, Perfect optics with imperfect components. Optica. 2015;2(8):747-750.

Miller, Reconfigurable add-drop multiplexer for spatial modes. Optics Express. 2013;21(17):20220-9. DOI: 10.1364/OE.21.020220.

Miller, Self-aligning universal beam coupler, Optics Express. 2013;21(5):6360-70.

Miller, Self-configuring universal linear optical component [Invited]. Photonics Research. 2013;1(1):1-15. URL:http://dx.doi.org/10.1364/PRJ.1.000001.

Misra et al., Artificial neural networks in hardware: A survey of two decades of progress. Neurocomputing. 2010;74:239-255.

Mohseni et al., Environment-assisted quantum walks in photosynthetic complexes. The Journal of Chemical Physics. 2008;129:174106. 10 pages. DOI: 10.1063/1.3002335.

Moore, Cramming more components onto integrated circuits. Proceeding of the IEEE. 1998;86(1):82-5.

Mower et al., Efficient generation of single and entangled photons on a silicon photonic integrated chip. Physical Review A. 2011;84:052326. 7 pages. DOI: 10.1103/PhysRevA.84.052326.

Mower et al., High-fidelity quantum state evolution in imperfect photonic integrated circuits. Physical Review A. 2015;92(3):032322. 7 pages, doi: 10.1103/PhysRevA.92.032322.

Nagamatsu et al., A 15 NS 32x32-bit CMOS multiplier with an improved parallel structure. IEEE Custom Integrated Circuits Conference. 1989. 4 pages.

Najafi et al., On-Chip Detection of Entangled Photons by Scalable Integration of Single-Photon Detectors. arXiv: 1405.4244. May 16, 2014. 27 pages.

Najafi et al., On-Chip detection of non-classical light by scalable integration of single-photon detectors. Nature Communications. 2015;6:5873. 8 pages. DOI: 10.1038/ncomms6873.

Naruse, Nanophotonic Information Physics. Nanointelligence and Nanophotonic Computing. Springer. 2014. 261 pages. DOI 10.1007/978-3-642-40224-1.

Nozaki et al., Sub-femtojoule all-optical switching using a photonic-crystal nanocavity. Nature Photonics. 2010;4:477-483. doi: 10.1038/NPHOTON.2010.89.

O'Brien et al., Demonstration of an all-optical quantum controlled-NOT gate. Nature. 2003;426:264-7.

Onsager, Crystal Statistics. I. A Two-Dimensional Model with an Order-Disorder Transition. Physical Review. 1944;65(3,4):117-149.

Orcutt et al., Nanophotonic integration in state-of-the-art CMOS foundries. Optics Express. 2011;19(3):2335-46.

Pelissetto et al., Critical phenomena and renormalization-group theory. Physics Reports. Apr. 2002. 150 pages.

Peng, Implementation of AlexNet with Tensorflow. https://github.com/ykpengba/AlexNet-A-Practical-Implementation. 2018. 2 pages, [last accessed Sep. 24, 2019].

Peretto, Collective properties of neural networks: A statistical physics approach. Biological Cybernetics. 1984;50:51-62.

Pernice et al., High-speed and high-efficiency travelling wave single-photon detectors embedded in nanophotonic circuits. Nature Communications 2012;3:1325. 10 pages. DOI: 10.1038/ncomms2307.

Peruzzo et al., Quantum walk of correlated photons. Science. 2010;329;1500-3. DOI: 10.1126/science.1193515.

Politi et al., Integrated Quantum Photonics, IEEE Journal of Selected Topics in Quantum Electronics, 2009;5(6):1-12. DOI: 10.1109/JSTQE.2009.2026060.

Politi et al., Silica-on-Silicon Waveguide Quantum Circuits. Science. 2008;320:646-9. DOI: 10.1126/science.1155441.

Poon et al., Neuromorphic silicon neurons and large-scale neural networks: challenges and opportunities. Frontiers in Neuroscience. 2011;5:1-3. doi: 10.3389/fnins.2011.00108.

Prucnal et al., Recent progress in semiconductor excitable lasers for photonic spike processing. Advances in Optics and Photonics. 2016;8(2):228-299.

Psaltis et al., Holography in artificial neural networks. Nature. 1990;343:325-330.

Qiao et al., 16x16 non-blocking silicon electro-optic switch based on mach zehnder interferometers. Optical Fiber Communication Conference. Optical Society of America. 2016. 3 pages.

Ralph et al., Linear optical controlled-NOT gate in the coincidence basis. Physical Review A. 2002;65:062324-1-062324-5. DOI: 10.1103/PhysRevA.65.062324.

Ramanitra et al., Scalable and multi-service passive optical access infrastructure using variable optical splitters. Optical Fiber Communication Conference. Optical Society of America. 2005. 3 pages.

Raussendorf et al., A one-way quantum computer. Physical Review Letter. 2001;86(22):5188-91. DOI: 10.1103/PhysRevLett.86.5188.

Rechtsman et al., Photonic floquet topological insulators. Nature. 2013;496:196-200. doi: 10.1038/nature12066.

Reck et al., Experimental realization of any discrete unitary operator. Physical review letters. 1994;73(1):58-61. 6 pages.

Reed et al., Silicon optical modulators. Nature Photonics. 2010;4:518-26. DOI: 10.1038/NPHOTON.2010.179.

(56) References Cited

OTHER PUBLICATIONS

Rendl et al., Solving Max-Cut to optimality by intersecting semidefinite and polyhedral relaxations. Mathematical Programming. 2010;121:307-335. doi: 10.1007/s10107-008-0235-8.
Rios et al., Integrated all-photonic non-volatile multilevel memory. Nature Photonics. 2015;9:725-732. doi: 10.1038/NPHOTON.2015.182.
Rogalski, Progress in focal plane array technologies. Progress in Quantum Electronics. 2012;36:342-473.
Rohit et al., 8x8 space and wavelength selective cross-connect for simultaneous dynamic multi-wavelength routing. Optical Fiber Communication Conference. OFC/NFOEC Technical Digest. 2013. 3 pages.
Rosenblatt, The perceptron: a probabilistic model for information storage and organization in the brain. Psychological Review. 1958;65(6):386-408.
Russakovsky et al., ImageNet Large Scale Visual Recognition Challenge. arXiv:1409.0575v3. Jan. 2015. 43 pages.
Saade et al., Random projections through multiple optical scattering: Approximating Kernels at the speed of light. arXiv:1510.06664v2. Oct. 25, 2015. 6 pages.
Salandrino et al., Analysis of a three-core adiabatic directional coupler. Optics Communications. 2009;282:4524-6. doi:10.1016/j.optcom.2009.08.025.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997; 14(11):2865-8.
Schmtdhuber, Deep learning in neural networks: An overview. Neural Networks. 2015;61:85-117.
Schreiber et al., Decoherence and Disorder in Quantum Walks: From Ballistic Spread to Localization. Physical Review Letters. 2011; 106:180403. 4 pages. DOI: 10.1103/PhysRevLett.106.180403.
Schwartz et al., Transport and Anderson localization in disordered two-dimensional photonic lattices. Nature. 2007;446:52-5. doi:10.1038/nature05623.
Selden, Pulse transmission through a saturable absorber. British Journal of Applied Physics. 1967;18:743-8.
Shafiee et al., ISAAC: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. DOI: 10.1038/NPHOTON.2017.93.
Shoji et al., Low-crosstalk 2x2 thermo-optic switch with silicon wire waveguides. Optics Express.2010;18(9):9071-5.
Silver et al. Mastering chess and shogi by self-play with a general reinforcement learning algorithm. arXiv preprint arXiv:1712.01815. 19 pages. 2017.
Silver et al., Mastering the game of go with deep neural networks and tree search. Nature. 2016;529:484-9. 20 pages. doi:10.1038/nature16961.
Silver et al., Mastering the game of Go without human knowledge. Nature. 2017;550:354-9. 18 pages. doi:10.1038/nature24270.
Silverstone et al., On-chip quantum interference between silicon photon-pair sources. Nature Photonics. 2014;8:104-8. DOI: 10.1038/NPHOTON.2013.339.
Smith et al., Phase-controlled integrated photonic quantum circuits. Optics Express. 2009;17(16):13516-25.
Soljacic et al., Optimal bistable switching in nonlinear photonic crystals. Physical Review E. 2002;66:055601. 4 pages.
Solli et al., Analog optical computing. Nature Photonics. 2015;9:704-6.
Spring et al., Boson sampling on a photonic chip. Science. 2013;339:798-801. DOI: 10.1126/science.1231692.
Srinivasan et al., 56 Gb/s germanium waveguide electro-absorption modulator. Journal of Lightwave Technology. 2016;34(2):419-24. DOI: 10.1109/JLT.2015.2478601.
Steinkraus et al., Using GPUs for machine learning algorithms. Proceedings of the 2005 Eight International Conference on Document Analysis and Recognition. 2005. 6 pages.
Suda et al., Quantum interference of photons in simple networks. Quantum Information Process. 2013;12:1915-45. DOI 10.1007/s11128-012-0479-3.
Sun et al., Large-scale nanophotonic phased array. Nature. 2013;493:195-9. doi:10.1038/nature11727.
Sun et al., Single-chip microprocessor that communicates directly using light. Nature. 2015;528:534-8. doi:10.1038/nature16454.
Suzuki et al., Ultra-compact 8x8 strictly-non-blocking Si-wire PILOSS switch. Optics Express. 2014;22(4):3887-94. DOI:10.1364/OE.22.003887.
Sze et al., Efficient processing of deep neural networks: A tutorial and survey. Proceedings of the IEEE. 2017;105(12):2295-2329. DOI: 10.1109/JPROC.2017.276174.
Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.
Tait et al., Broadcast and weight: An integrated network for scalable photonic spike processing. Journal of Lightwave Technology. 2014;32(21):3427-39. DOI: 10.1109/JLT.2014.2345652.
Tait et al., Chapter 8 Photonic Neuromorphic Signal Processing and Computing. Springer, Berlin, Heidelberg. 2014. pp. 183-222.
Tait et al., Neuromorphic photonic networks using silicon photonic weight banks. Scientific Reports. 2017;7:7430. 10 pages.
Tanabe et al., Fast bistable all-optical switch and memory on a silicon photonic crystal on-chip. Optics Letters. 2005;30(19):2575-7.
Tanizawa et al., Ultra-compact 32x32 strictly-non-blocking Si-wire optical switch with fan-out LGA interposer. Optics Express. 2015;23(13):17599-606. DOI:10.1364/OE.23.017599.
Thompson et al., Integrated waveguide circuits for optical quantum computing. IET Circuits, Devices, & Systems. 2011;5(2):94-102. doi: 10.1049/iet-cds.2010.0108.
Timurdogan et al., An ultralow power athermal silicon modulator. Nature Communications. 2014;5:4008. 11 pages. DOI: 10.1038/ncomms5008.
Vandoorne et al., Experimental demonstration of reservoir computing on a silicon photonics chip. Nature Communications. 2014;5:3541. 6 pages. DOI: 10.1038/ncomms4541.
Vazquez et al., Optical NP problem solver on laser-written waveguide plat-form. Optics Express. 2018;26(2):702-10.
Vivien et al., Zero-bias 40gbit/s germanium waveguide photodetector on silicon. Optics Express. 2012;20(2):1096-1101.
Wang et al., Coherent Ising machine based on degenerate optical parametric oscillators. Physical Review A. 2013;88:063853. 9 pages. DOI: 10.1103/PhysRevA.88.063853.
Wang et al., Deep learning for identifying metastatic breast cancer. arXiv preprint arXiv:1606.05718. Jun. 18, 2016. 6 pages.
Werbos, Beyond regression: New tools for prediction and analysis in the behavioral sciences. Ph.D. dissertation, Harvard University. Aug. 1974. 454 pages.
Whitfield et al., Simulation of electronic structure Hamiltonians using quantum computers. Molecular Physics. 2010;109(5,10):735-50. DOI: 10.1080/00268976.2011.552441.
Wu et al., An optical fiber network oracle for NP-complete problems. Light: Science & Applications. 2014;3: e147. 5 pages. doi:10.1038/lsa.2014.28.
Xia et al., Mode conversion losses in silicon-on-insulator photonic wire based racetrack resonators. Optics Express. 2006;14(9):3872-86.
Xu et al., Experimental observations of bistability and instability in a two-dimensional nonlinear optical superlattice. Physical Review Letters. 1993;71(24):3959-62.
Yang et al., Non-Blocking 4x4 Electro-Optic Silicon Switch for On-Chip Photonic Networks. Optics Express 2011;19(1):47-54.
Yao et al., Serial-parallel multipliers. Proceedings of 27th Asilomar Conference on Signals, Systems and Computers. 1993. pp. 359-363.

(56) References Cited

OTHER PUBLICATIONS

Young et al., Recent trends in deep learning based natural language processing. IEEE Computational Intelligence Magazine. arXiv:1708.02709v8. Nov. 2018. 32 pages.

Zhou et al., Calculating Unknown Eigenvalues with a Quantum Algorithm. Nature Photonics. 2013;7:223-8. DOI: 10.1038/NPHOTON.2012.360.

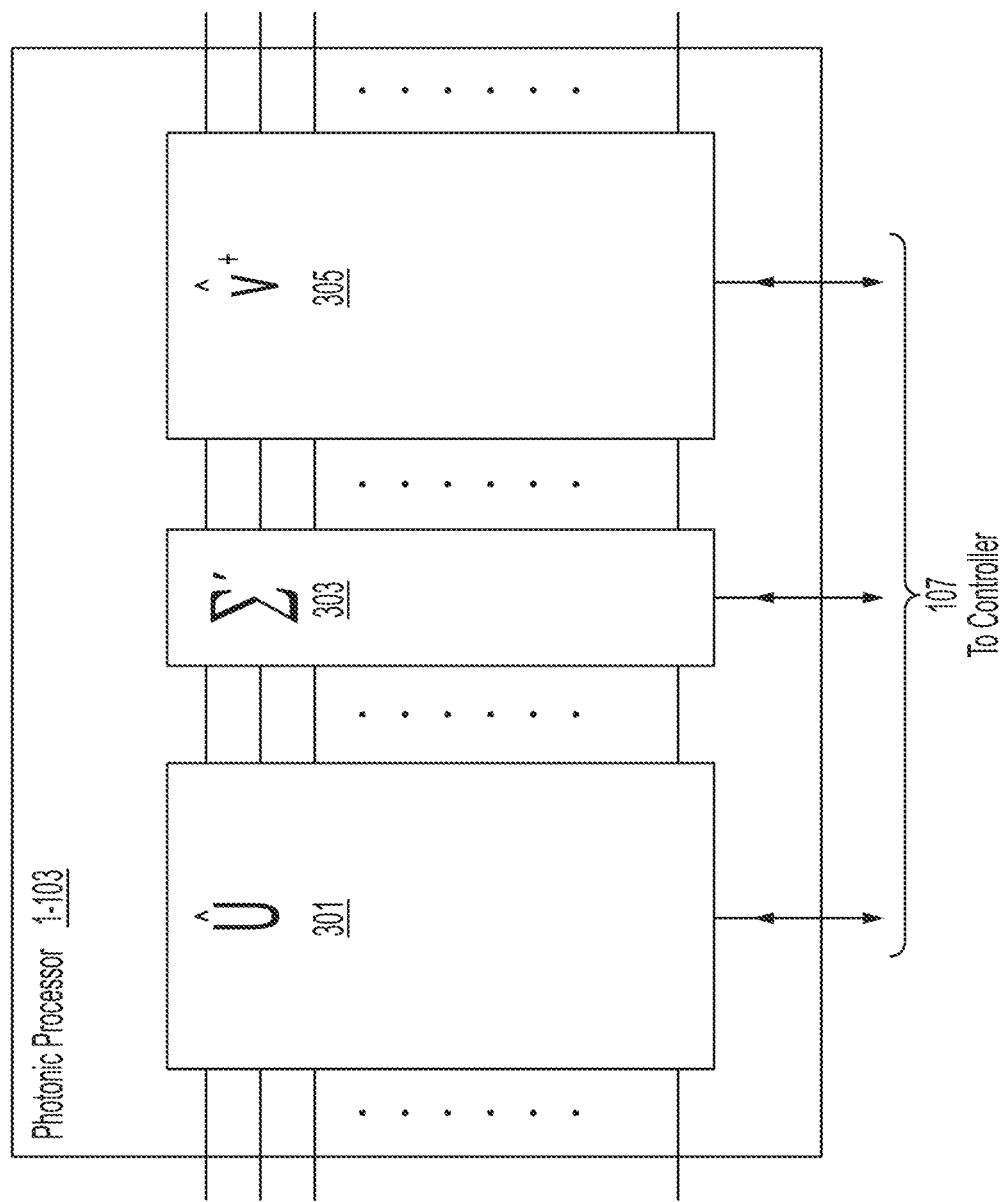

PATH-NUMBER-BALANCED UNIVERSAL PHOTONIC NETWORK

RELATED APPLICATIONS

This application claims priority under 35 § USC 119(e) to U.S. Provisional Patent Application Ser. No. 62/810,105, filed Feb. 25, 2019, entitled "PATH-NUMBER-BALANCED UNIVERSAL PHOTONIC NETWORK," which is hereby incorporated herein by reference in its entirety.

BACKGROUND

Conventional computation uses processors that include circuits of millions of transistors to implement logical gates on bits of information represented by electrical signals. The architectures of conventional central processing units (CPUs) are designed for general purpose computing, but are not optimized for particular types of algorithms. Consequently, specialized processors have been developed with architectures better-suited for particular algorithms. Graphical processing units (GPUs), for example, have a highly parallel architecture that makes them more efficient than CPUs for performing image processing, graphical manipulations, and other parallelizable applications, such as for neural networks and deep learning. This realization, and the increasing popularity of artificial intelligence and deep learning, led to further research into new processor architectures that could further enhance the speed of these algorithms.

BRIEF SUMMARY

Some embodiments are directed to a programmable optical network for representing a first matrix of size N×M. The programmable optical network includes an array of optical component locations, a plurality of optical modes optically coupled to the array of optical component locations, the plurality of optical modes comprising P optical modes, where P is a value greater than a larger of N and M, a plurality of active optical components arranged at first optical component locations of the array of optical component locations, and one or more passive optical components arranged at second optical component locations of the array of optical component locations, the second optical component locations being disposed at a substantially central location of the array. The first matrix is embedded in a second matrix within the programmable optical network, and the second matrix comprising a dimensionality greater than a larger of N and M.

Some embodiments are directed to a photonic processing system. The photonic processing system comprises an optical encoder configured to encode an input vector into a first plurality of optical signals, a photonic processor configured to perform a plurality of operations on the first plurality of optical signals and to output a second plurality of optical signals representing an output vector, the output vector representing a matrix multiplication of the input vector and a first matrix of size N×M, and an optical receiver configured to detect the second plurality of optical signals and output an electrical representation of the output vector. The photonic processor comprises an array of optical component locations, a plurality of active optical components arranged at first optical component locations of the array of optical component locations, and one or more passive optical components arranged at second optical component locations of the array of optical component locations, the second optical component locations being disposed at a substantially central location of the array.

Some embodiments are directed to a method of optically performing matrix-vector multiplication. The method comprises receiving a digital representation of an input vector, encoding, using an optical encoder, the input vector into a first plurality of optical signals, performing, using a processor, a dilation of a first matrix of size N×M to determine a second matrix comprising a dimensionality greater than a larger of N and M, the second matrix comprising the first matrix in contiguous N×M elements of the second matrix, controlling a photonic processor to optically implement the contiguous N×M elements of the second matrix, the photonic processor comprising a plurality of active optical components and one or more passive optical components arranged in an array, the one or more passive optical components being disposed at a substantially central location of the array, propagating the first plurality of optical signals through the photonic processor, detecting a second plurality of optical signals received from the photonic processor, and determining an output vector based on the detected second plurality of optical signals, wherein the output vector represents a result of the matrix-vector multiplication.

Some embodiments are directed to a method of manufacturing a programmable optical network for representing a matrix of size N×M. The method comprises forming a plurality of active optical components arranged at first optical component locations of an array of optical component locations, forming one or more passive optical components arranged at second optical component locations of the array of optical component locations, the second optical component locations being disposed at a substantially central location of the array, and forming a plurality of optical connections between active optical components of the plurality of active optical components and passive optical components of the one or more passive optical components.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 3 is a schematic diagram illustrating an example of a photonic processor, in accordance with some embodiments of the technology described herein;

DETAILED DESCRIPTION

Figure 1:
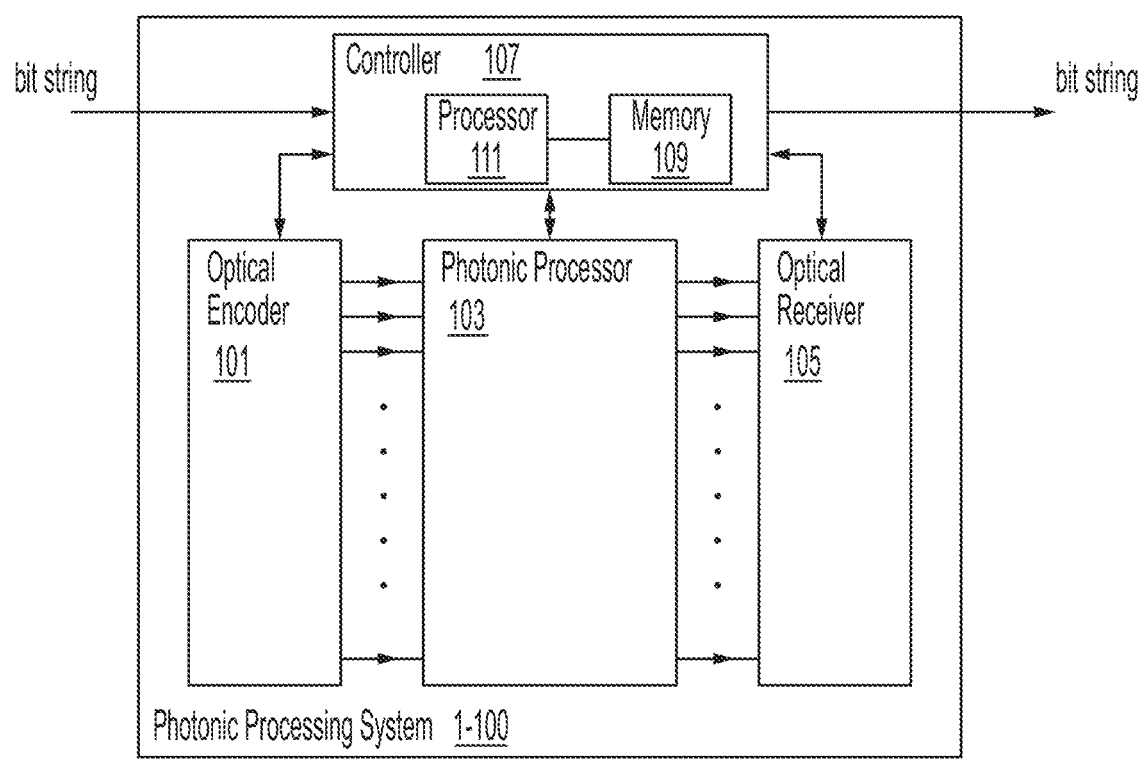
FIG. 1 is a schematic diagram illustrating an example of a photonic processing system, in accordance with some embodiments of the technology described herein.

Processors based on electrical circuits face limitations regarding speed and efficiency due to electrical properties such as impedance. For example, connecting multiple processor cores and/or connecting a processor core to a memory uses a conductive trace with a non-zero impedance. Large values of impedance limit the maximum rate at which data can be transferred through the trace with a negligible bit error rate. For processing that requires billions of operations, these delays can result in a significant loss of time. In addition to electrical circuits' inefficiencies in speed, the heat generated by the dissipation of energy caused by the impedance of the circuits is also a barrier in developing electrical processors.

The inventors have recognized and appreciated that using light signals instead of electrical signals overcomes many of the aforementioned problems with electrical computing. Light signals travel at the speed of light in the medium in which the light is traveling; thus the latency of photonic signals is far less of a limitation than electrical propagation delay. Additionally, no power is dissipated by increasing the distance traveled by the light signals, opening up new topologies and processor layouts that would not be feasible using electrical signals. Thus, light-based processors, such as a photonics-based processor may have better speed and efficiency performance than conventional electrical processors.

The inventors have recognized and appreciated that a light-based processor, such as a photonics-based processor, may be well-suited for particular types of algorithms. For example, many machine learning algorithms, e.g. support vector machines, artificial neural networks, probabilistic graphical model learning, rely heavily on linear transformations on multi-dimensional arrays/tensors. The simplest example is multiplying a vector by a matrix, which using conventional algorithms has a complexity on the order of $O(N^2)$, where N is the dimensionality of a square matrix being multiplied by a vector of the same dimension. The inventors have recognized and appreciated that a photonics-based processor can perform linear transformations, such as matrix multiplication, in a highly parallel manner by propagating a particular set of input light signals through a configurable array of active optical components. Using such implementations, matrix-vector multiplication of dimension N=512 can be completed in hundreds of picoseconds, as opposed to the tens to hundreds of nanoseconds using conventional electronic circuit-based processing.

The inventors have further recognized and appreciated that some photonics-based processors suffer from "error sensitivity concentration." In such processors, the active optical components located near the center of the processor contribute larger errors to the resultant matrix implementation than the active optical components located near the edges of the processor. This error sensitivity concentration occurs because the central active optical components are connected to a larger number of optical pathways through the processor network than active optical components located at the edge of the processor.

The inventors have further recognized and appreciated that error sensitivity concentration is related to path-number imbalance within the photonics-based processor architecture. A processor that is path-balanced has a same number of optical paths from any input to any output of the processor. In contrast, some photonics-based processors exhibit extremal path-number imbalance wherein there is a single optical path from input 1 to output N but the number of paths from input N/2 to output N/2 scales exponentially with N.

Accordingly, the inventors have recognized that path-number imbalance and error sensitivity concentration within an optical network can be reduced by replacing one or more active optical components near a central location of the optical network with passive optical components. Such passive optical components introduce less error into the optical network at highly-connected points within the optical network, reducing the overall error introduced into the resultant matrix implementation. Additionally, the inventors have recognized that a matrix can be implemented in such a path-balanced optical network by embedding the matrix in a higher-dimensional matrix. For example, a path-balanced network may implement an N×N matrix with at least $N^2$ active optical components.

Following below are more detailed descriptions of various concepts related to, and embodiments of, techniques for providing and using path-balanced optical networks. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Referring to FIG. 1, a photonic processing system 100 includes an optical encoder 101, a photonic processor 103, an optical receiver 105, and a controller 107, according to some embodiments. The photonic processing system 100 receives, as an input from an external processor (e.g., a CPU), an input vector represented by a group of input bit strings and produces an output vector represented by a group of output bit strings. For example, if the input vector is an M-dimensional vector, the input vector may be represented by M separate bit strings, each bit string representing a respective component of the vector. The input bit string may be received as an electrical or optical signal from the external processor and the output bit string may be transmitted as an electrical or optical signal to the external processor. In some embodiments, the controller 107 does not necessarily output an output bit string after every process iteration. Instead, the controller 107 may use one or more output bit strings to determine a new input bit stream to feed through the components of the photonic processing system 100. In some embodiments, the output bit string itself may be used as the input bit string for a subsequent iteration of the process implemented by the photonic processing system 100. In other embodiments, multiple output bit streams are combined in various ways to determine a subsequent input bit string. For example, one or more output bit strings may be summed together as part of the determination of the subsequent input bit string.

The optical encoder 101 is configured to convert the input bit strings into optically encoded information to be processed by the photonic processor 103. In some embodiments, each input bit string is transmitted to the optical encoder 101 by the controller 107 in the form of electrical signals. The optical encoder 101 converts each component of the input vector from its digital bit string into an optical signal. In some embodiments, the optical signal represents the value and sign of the associated bit string as an amplitude and a phase of an optical pulse. In some embodiments, the phase may be limited to a binary choice of either a zero phase shift or a $\pi$ phase shift, representing a positive and negative value, respectively. Embodiments are not limited to real input vector values. Complex vector components may be represented by, for example, using more than two phase values when encoding the optical signal. In some embodiments, the bit string is received by the optical encoder 101 as an optical signal (e.g., a digital optical signal) from the controller 107. In these embodiments, the optical encoder 101 converts the digital optical signal into an analog optical signal of the type described above.

The optical encoder 101 outputs M separate optical pulses that are transmitted to the photonic processor 103. Each output of the optical encoder 101 is coupled one-to-one to a single input of the photonic processor 103. In some embodiments, the optical encoder 101 may be disposed on the same substrate as the photonic processor 103 (e.g., the optical encoder 101 and the photonic processor 103 are on the same chip). In such embodiments, the optical signals may be transmitted from the optical encoder 101 to the photonic processor 103 in waveguides, such as silicon photonic waveguides. In other embodiments, the optical encoder 101 may be disposed on a separate substrate from the photonic processor 103. In such embodiments, the optical signals may be transmitted from the optical encoder 101 to the photonic processor 103 in optical fiber.

The photonic processor 103 performs the multiplication of the input vector by a matrix A having a dimensionality of N×M. In some embodiments, the matrix A may be embedded into another matrix U having a larger size than the matrix A (e.g., an X×Y matrix where X>max(N, M) and Y>max(N, M)). The N×M elements of matrix A may be located in contiguous N×M elements of matrix U. In some embodiments, the N×M elements of matrix A may be located in contiguous N×M elements at or near a center of matrix U.

In some embodiments, the matrix A may be a square matrix having a size of N×N. In such embodiments, the matrix U may be a dilation of the matrix A with a size of Z×Z, where Z>N. The N×N elements of the matrix A may be located in contiguous N×N elements of the matrix U. In some embodiments, the N×N elements of matrix A may be located in contiguous N×N elements at or near a center of matrix U. Alternatively or additionally, in some embodiments, the matrix U may be a unitary dilation of the matrix A with a size of 2N×2N, wherein the N×N elements of the matrix A are located in contiguous N×N elements of the matrix U. The contiguous N×N elements may be positioned as the center N×N elements of the matrix U.

In some embodiments, the embedding of matrix A into matrix U may be performed by the controller 107 (e.g., using processor 111). Some or all of the elements of matrix U may be implemented by the photonic processor 103. In some embodiments, only the N×M or N×N elements of the matrix A may be implemented by the photonic processor 103. In some embodiments, additional elements of matrix U are implemented by the photonic processor 103. Alternatively, in some embodiments, only a portion of the N×M or N×N elements of the matrix A may be implemented by the photonic processor 103.

In some embodiments, the photonic processor 103 is arranged as an array including active optical components and passive optical components. As used herein, an "active" optical component may be programmably controlled and/or tuned in order to implement an element of the desired matrix (e.g., matrix A). A "passive" optical component may be optically passive in nature (e.g., a photonic waveguide) or may also be programmably controlled and/or tuned (e.g., for calibration purposes), but is not programmably controlled to implement the desired matrix within the array. The passive optical components may be arranged near a central location of the array in order to reduce error sensitivity concentration of the array. The active optical components may be configured to implement a transformation on the array of input optical pulses that is equivalent to a matrix-vector multiplication.

Alternatively, in some embodiments, the matrix A may be decomposed into three matrices using a combination of a singular value decomposition (SVD) and a unitary matrix factorization algorithm, as described in U.S. Patent Application Publication 2019/0356394 filed on May 14, 2019, and titled "Photonic Processing Systems and Methods," which is incorporated herein by reference in its entirety. In some embodiments, the unitary matrix factorization is performed with operations similar to Givens rotations in QR decomposition. For example, an SVD in combination with a Householder decomposition may be used. The decomposition of the matrix A into three constituent parts may be performed by the controller 107 and each of the constituent parts may be implemented by a portion of the photonic processor 103. In some embodiments, the photonic processor 103 includes three parts: a first array of active and passive optical components configured to implement a transformation on the array of input optical pulses that is equivalent to a first matrix multiplication; a group of active optical components configured to adjust the intensity and/or phase of each of the optical pulses received from the first array, the adjustment being equivalent to a second matrix multiplication by a diagonal matrix; and a second array of active and passive optical components configured to implement a transformation on the optical pulses received from the second group of active optical components, the transformation being equivalent to a third matrix multiplication.

The photonic processor 103 outputs N separate optical pulses that are transmitted to the optical receiver 105, in accordance with some embodiments of the technology described herein. Each output of the photonic processor 103 is coupled one-to-one to a single input of the optical receiver 105. In some embodiments, the photonic processor 103 may be disposed on the same substrate as the optical receiver 105 (e.g., the photonic processor 103 and the optical receiver 105 are on the same chip). In such embodiments, the optical signals may be transmitted from the photonic processor 103 to the optical receiver 105 in silicon photonic waveguides. In other embodiments, the photonic processor 103 may be disposed on a separate substrate from the optical receiver 105. In such embodiments, the optical signals may be transmitted from the photonic processor 103 to the optical receiver 105 in optical fibers.

The optical receiver 105 receives the N optical pulses from the photonic processor 103. Each of the optical pulses is then converted to electrical signals. In some embodiments, the intensity and phase of each of the optical pulses may be measured by optical detectors within the optical receiver. The electrical signals representing those measured values are then output to the controller 107.

The controller 107 includes a memory 109 and a processor 111 for controlling the optical encoder 101, the photonic processor 103, and the optical receiver 105. The memory 109 may be used to store input and output bit strings and measurement results from the optical receiver 105. The memory 109 also stores executable instructions that, when executed by the processor 111, control the optical encoder 101, perform the matrix programming algorithm, control the active optical components of the photonic processor 103, and control the optical receivers 105. The memory 109 may also include executable instructions that cause the processor 111 to determine a new input vector to send to the optical encoder based on a collection of one or more output vectors determined by the measurement performed by the optical receiver 105. In this way, the controller 107 can control an iterative process by which an input vector is multiplied by multiple matrices by adjusting the settings of the photonic processor 103 and feeding detection information from the optical receiver 105 back to the optical encoder 101. Thus, the output vector transmitted by the photonic processing system 100 to the external processor may be the result of multiple matrix multiplications, not simply a single matrix multiplication.

In some embodiments, a matrix may be too large to be encoded in the photonic processor using a single pass. In such situations, one portion of the large matrix may be encoded in the photonic processor and the multiplication process may be performed for that single portion of the large matrix. The results of that first operation may be stored in memory 109. Subsequently, a second portion of the large matrix may be encoded in the photonic processor and a second multiplication process may be performed. This "chunking" of the large matrix may continue until the multiplication process has been performed on all portions of the large matrix. The results of the multiple multiplication processes, which may be stored in memory 109, may then be combined to form the final result of the multiplication of the input vector by the large matrix.

In other embodiments, only collective behavior of the output vectors is used by the external processor. In such embodiments, only the collective result, such as the average or the maximum/minimum of multiple output vectors, is transmitted to the external processor.

Figure 2A:
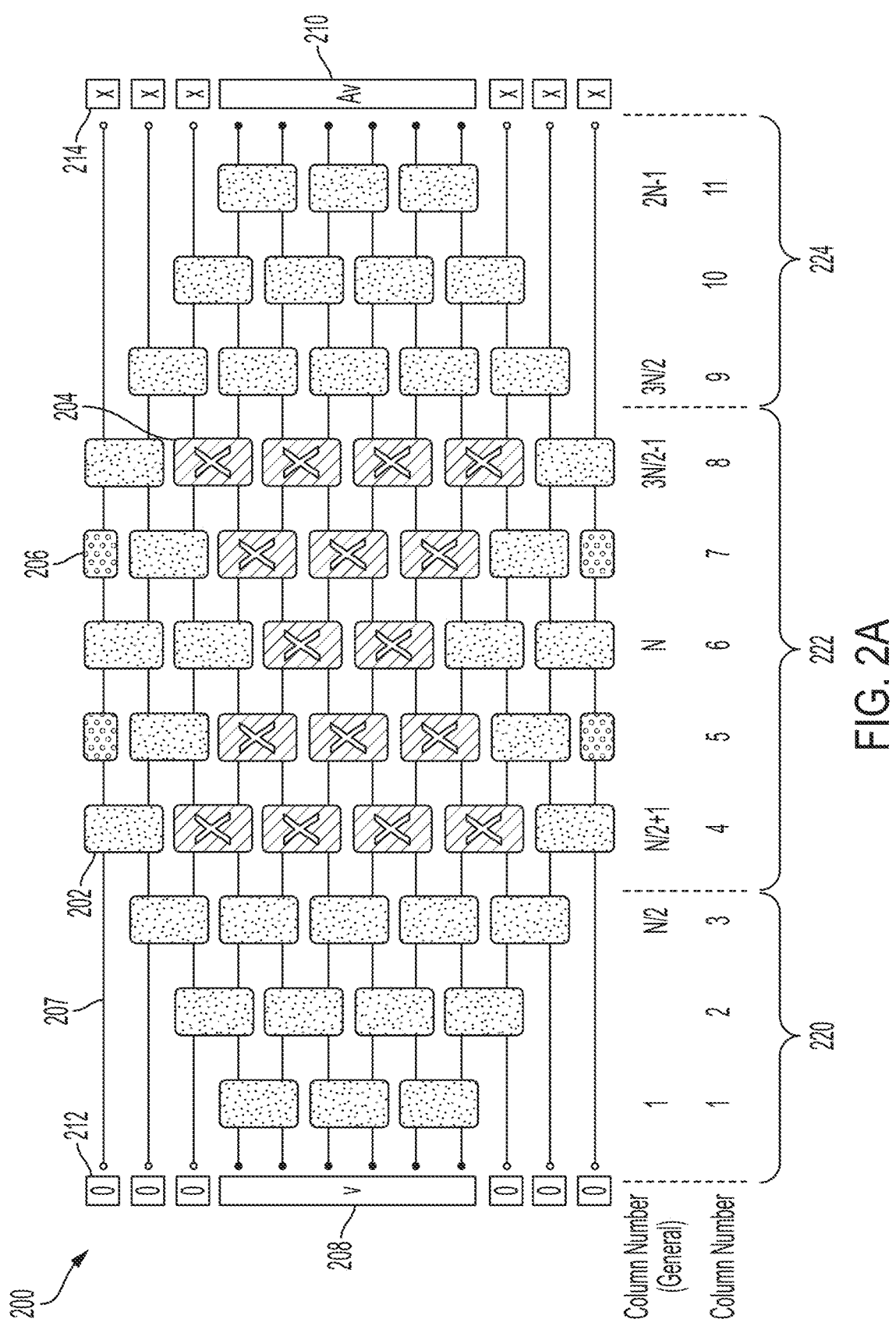
FIG. 2A is a schematic diagram illustrating an example of a path-balanced optical network, in accordance with some embodiments of the technology described herein.

FIG. 2A depicts an example of an optical network 200 which may be used as photonic processor 103 in photonic processing system 100, in accordance with some embodiments of the technology described herein. Alternatively, as will be discussed in connection with FIG. 4, optical network 200 may be used as a portion of photonic processor 103 in some embodiments. It may be appreciated that the optical network 200 of FIG. 2A is a particular example arranged to embed a 6×6 matrix, but that the following discussion is applicable to an array configured to implement a square matrix of any size, N×N. As may be appreciated from the following discussion in connection with FIGS. 5A-5E, in some embodiments, the array may alternatively be arranged to implement a matrix of any size, N×M.

The optical network 200 may be arranged as an array of optical components disposed at locations within the array, in accordance with some embodiments of the technology described herein. In the example of FIG. 2A, the array of optical network 200 is arranged as an octagonal array, but as will be discussed in connection with the examples of FIGS. 5A-5E, the optical network 200 may comprise alternative arrangements, including asymmetric arrangements. In some embodiments, the optical components of optical network 200 may include active optical components 202, passive optical components 204, and optional linking optical components 206. Photonic waveguides 207 (e.g., silicon waveguides) may link optical components 202, 204, 206 within the array and/or to external inputs and outputs to the array.

In some embodiments, optical network 200 may be configured to reduce path-number imbalances within the network in addition to decreasing an optical depth of the network as compared to a minimal Clements grid singular value architecture. In some embodiments, optical network 200 may be arranged as an octagonal array with distinct sections: an input section 220, a middle section 222, and an output section 224. The octagonal array may be configured to implement a square matrix A of size N×N.

In some embodiments, input section 220 may include a total of N/2 columns. The first column may include N/2 total active optical components 202. Subsequent columns may include an increasing number (e.g., increasing by one) of active optical components 202 thereafter, such that column number N/2 includes N−1 active optical components 202. In the example of FIG. 2A, where N=6, input section 220 includes three total columns, and the first column includes three active optical components 202. The number of active optical components 202 increases by one in each subsequent column such that the third column includes five active optical components 202.

In some embodiments, middle section 222 may begin with column number N/2+1 and may end with column number 3N/2−1. Column number N/2+1 may include N total optical components, and each column may alternate between N−1 and N total optical components thereafter such that column number 3N/2−1 includes N total optical components. Column number N/2+1 may include N−1 passive optical components 204 and two active optical components 202. The number of passive optical components 204 may decrease by one in each column thereafter until reaching column number N, which may include N/2−1 passive optical components 204. The number of passive optical components 204 may increase by one in each column after column number N until reaching column number 3N/2−1, which again includes N−1 passive optical components 204.

In the example of FIG. 2A, where N=6, middle section 224 includes five columns spanning from column number four to column number eight. Column number four of optical network 200 includes six total optical components, four of which are passive optical components. The total number of optical components alternates between five total optical components and six total optical components, with column number eight including six total optical components. The number of passive optical components 204 decreases by one in each column after column number four until column number six, which includes two passive optical components 204. The number of passive optical components 204 thereafter increases by one in each column until reaching four passive optical components 204 in column number eight.

In some embodiments, output section 224 may include a total of N/2 columns. The first column of the output section 224 may include N/2 total active optical components 202. Subsequent columns may include a decreasing number of active optical components 202 thereafter, such that column number 2N−1 includes N/2 active optical components 202. In the example of FIG. 2A, where N=6, output section 224 includes three total columns spanning from column number nine through column number eleven. Column number nine includes three active optical components 202. The number of active optical components 202 decreases by one in each subsequent column such that the column number eleven includes three active optical components 202. It may be appreciated that in some embodiments, the input section 220 and/or the output section 224 may also include one or more passive optical components 204, though they are depicted in the example of FIG. 2A as only including active optical components 202.

In some embodiments, the active optical components 202 may be used to implement the matrix A within the optical network 200. In some embodiments, the active optical components 202 may be configured to couple two or more optical modes within the optical network 200. The active optical components 202 may also be configured to perform a 2×2 unitary operation (e.g., a rotation). For example, the active optical components 202 may be controllable 2×2 couplers. The controllable 2×2 couplers may include variable beam splitters (VBSs), such as Mach-Zehnder interferometers (MZIs) and/or microelectromechanical systems (MEMS) actuators. In some embodiments, such as in the example of FIG. 2A, there may be $N^2$ active optical components 202 arranged within optical network 200. Alternatively, it may be appreciated that in some embodiments there may be fewer than $N^2$ active optical components 202 or greater than $N^2$ active optical components 202. In other embodiments, such as those described in connection with FIGS. 5A-5E, there may be NM active optical components (e.g., to implement an N×M matrix), fewer than NM active optical components 202, or greater than NM active optical components 202.

In some embodiments, passive optical components 204 may be arranged around a substantially central location within the optical network 200. As described previously, the "passive" optical components 204 may still be programmably controllable (e.g., for calibration or other purposes), but may not be used to implement the matrix A within the optical network 200. The passive optical components 204 may be configured to perform a 2×2 swap operation within the optical network 200. For example, the passive optical components 204 may comprise one or more of 90-degree waveguide crossings and/or directional couplers.

In some embodiments, linking optical components 206 may be included in optical network 200, though it may be appreciated that linking optical components 206 are optional and may be replaced with photonic waveguides 207, in some embodiments. Linking optical components 206 may comprise, for example, phase shifters (e.g., single-mode phase shifters) configured to correct for any phase error imparted from differences in optical path lengths within the optical network 200.

As may be appreciated from the example of FIG. 2A, the total number of optical modes of optical network 200 may be P>N, in accordance with some embodiments of the technology described herein. However, a subset of input optical modes 208 of the total M optical modes may be used to implement input vector v. Accordingly, optical network 200 may have additional free input optical modes 212 that are not used to implement input vector v within the optical network 200. Rather, free input optical modes 212 may be set to implement zeroes during computation and/or may be used during calibration or monitoring of the optical network 200. In the particular example of FIG. 2A, the total number of optical modes is P=2N, the input vector v is implemented by N input optical modes 208, and the optical network 200 includes N free input optical modes 212.

In some embodiments, the result of the matrix-vector multiplication Av performed by the optical network may be output by output optical modes 210, which may be a subset of the total optical modes, M, of optical network 200. The number of output optical modes 210 may be the same as the number of input optical modes 208, though in some embodiments the input and output optical modes may be asymmetric. Similarly, in some embodiments there may be a number of free output optical modes 214 which may be used for calibration and/or monitoring of the optical network 200. In the example of FIG. 2A, the total number of optical modes is M=2N, the result of the matrix-vector multiplication Av is output by N output optical modes 210, and the optical network 200 includes N free output optical modes 214.

Figure 2B:
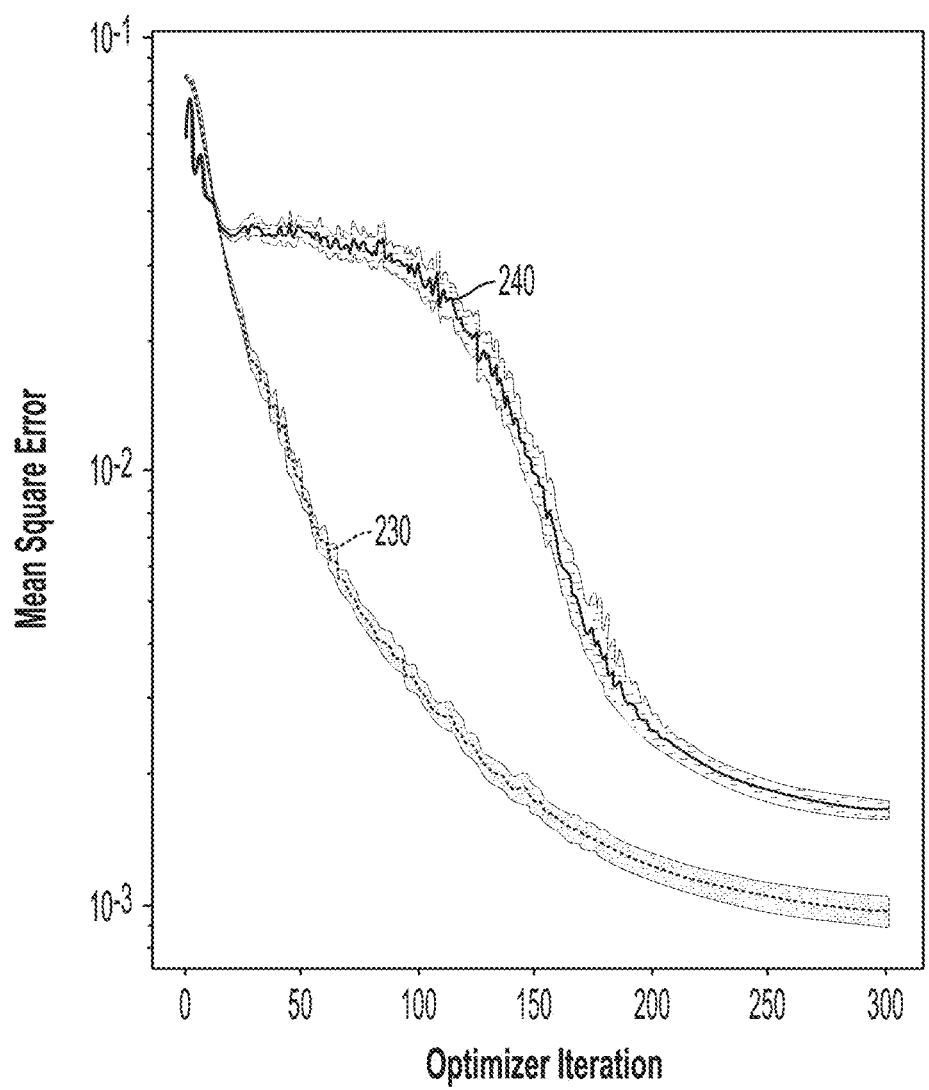
FIG. 2B is a plot of simulated error for a photonic processor including the path-balanced optical network of FIG. 2A and a photonic processor including a minimal Clements grid singular-value decomposition architecture, in accordance with some embodiments of the technology described herein.

FIG. 2B depicts a comparison of mean square error 230 calculated for the optical network 200 of FIG. 2A and mean square error 240 calculated for a minimal Clements grid SVD architecture, as described in connection with FIG. 3, in accordance with some embodiments described herein. The mean square errors 230, 240 were calculated using a stochastic gradient optimizer (e.g., AdamW) to program a random target 10×10 matrix, A, obeying the constraint $\|A\|=1$. Shaded lines show 95% confidence intervals extracted from 100 trials. As may be appreciated from FIG. 2B, the mean square error 230 of optical network 200 of FIG. 2A is less than the mean square error 240 of a minimal Clements grid SVD architecture over a large number of iterations.

FIG. 3 depicts a block diagram of an alternative photonic processor 103 that implements matrix multiplication on an input vector represented by M input optical pulses and includes three main components: a first matrix implementation 301, a second matrix implementation 303, and a third matrix implementation 305, in accordance with some embodiments described herein. In some embodiments, the first matrix implementation 301 and the third matrix implementation 305 include an optical network (e.g., optical network 200) of active optical components and passive optical components configured to transform the M input optical pulses from an input vector to an output vector, the components of the vectors being represented by the amplitude and phase of each of the optical pulses. In some embodiments, the second matrix implementation 303 includes a group of electro-optic components, as described in U.S. Patent Application Publication 2019/0356394 filed on May 14, 2019, and titled "Photonic Processing Systems and Methods," which is incorporated herein by reference in its entirety.

In some embodiments, photonic processor 103 may include a Clements-style alternating column grid of optical components, and an arbitrary matrix A may be programmed into the photonic processor 103 by determining settings for two unitary photonic meshes (e.g., in first and third matrix implementations 301 and 305) and a Sigma column (e.g., in second matrix implementation 303), as described in more detail below. In some embodiments, photonic processor 103 may comprise a minimal Clements grid SVD architecture. As used herein, a minimal Clements grid SVD architecture may comprise a same number of optical modes as the dimensionality of the matrix being implemented by the photonic mesh. Alternatively, in some embodiments, photonic processor 103 may comprise a Clements grid SVD architecture in which the photonic mesh comprises a greater number of optical modes than the dimensionality of the matrix being implemented by the photonic mesh.

The matrix by which the input vector is multiplied, by passing the input optical pulses through the photonic processor 103, is referred to as A. The matrix A is a general N×M matrix of real and/or complex values, known to the controller 107 as the matrix that should be implemented by the photonic processor 103. As such, the controller 107 decomposes the matrix A using a singular value decomposition (SVD) such that the matrix A is represented by three constituent matrices: $A = V^\dagger \Sigma U$, where U and V are unitary M×M and N×N matrices, respectively ($U^\dagger U = UU^\dagger = I_M$ and $V^\dagger V = VV^\dagger = I_N$), and Σ is an N×M diagonal matrix with entries known as singular values. The superscript "†" in all equations represents the complex conjugate transpose of the associated matrix, and $I_N$ and $I_M$ indicate identity matrices of dimension N and M, respectively. Determining the SVD of a matrix is known and the controller 107 may use any suitable technique to determine the SVD of the matrix A. The values of the diagonal singular values may also be further normalized such that the maximum absolute value of the singular values is 1.

Once the controller 107 has determined the matrices U, Σ and V for the matrix A, the controller 107 may further decompose the two unitary matrices U and V into a product of unitary matrices, such as Givens rotation matrices, as specified by a unitary matrix factorization algorithm, such as the QR decomposition or Clements decomposition. The controller 107 may use any suitable technique to determine the unitary matrix factorizations of U and V. The controller 107 may map the parameterization of such a unitary matrix factorization to the appropriate controllable parameters of the active optical components in the optical network. In some embodiments, such an optical network may comprise an alternating grid of columns of programmable 2×2 couplers. In some embodiments, the control of these active optical components may be parameterized in terms of phase shifts, rotation angles, trasmitivities and/or reflectivities, and/or separation distances of nano-optical-electro-mechanical (NOEMs) devices.

Based on the aforementioned factorization of an arbitrary unitary matrix into a product of a restricted set of unitary matrices, any unitary matrix can be implemented by a particular sequence of rotations and phase shifts. And in photonics, rotations may be represented by variable beam splitters (VBS) and phase shifts are readily implemented using phase modulators. Accordingly, for the M optical inputs of the photonic processor 103, the first matrix implementation 301 and the third matrix implementation 305, representing the unitary matrices of the SVD of the matrix A may be implemented by an interconnected array of VBSs and phase shifters. The second matrix implementation 303 may be a diagonal matrix of the SVD of the matrix A combined with the diagonal matrices D, of +1 and −1 values, associated with row and column signs that have been extracted from each of the unitary matrices of the SVD. As mentioned above, each matrix D is referred to as a "phase screen" and can be labeled with a subscript to denote whether it is the phase screen associated with the matrix U or the matrix V. Thus, the second matrix implementation 303 is the matrix $\Sigma' = D_V \Sigma D_U$. As mentioned above, in some embodiments, Σ may further be normalized. In some embodiments, the first matrix implementation 301 is denoted $\hat{U}$ to indicate that the phase screen $D_U$ has been factored out of U. In some embodiments, the third matrix implementation 305 is denoted $\hat{V}^\dagger$ to indicate that the phase screen $D_V$ has been factored out of $V^\dagger$.

In some embodiments, the VBS unit cell of the photonic processor 103 associated with the first matrix implementation 301 and the third matrix implementation 305 may be a Mach-Zehnder interferometer (MZI) with an internal phase shifter. In other embodiments, the VBS unit cell may be a microelectromechanical systems (MEMS) actuator. An external phase shifter may be used in some embodiments to implement the additional phase needed for complex-valued Givens rotations.

The second matrix implementation 303, representing the diagonal matrix $D_V \Sigma D_U$ may be implemented using an amplitude modulator and a phase shifter. In some embodiments, a VBS may be used to split off a portion of light that can be dumped to variably attenuate an optical pulse. Additionally or alternatively, a controllable gain medium may be used to amplify an optical signal. For example, GaAs, InGaAs, GaN, or InP may be used as an active gain medium for amplifying an optical signal. Other active gain processes such as the second harmonic generation in materials with crystal inversion symmetric, e.g. KTP and lithium niobate, and the four-wave mixing processes in materials that lack inversion symmetry, e.g. silicon, can also be used. A phase shifter in each optical mode may be used to apply either a zero or a π phase shift, depending on the phase screen being implemented. In some embodiments, only a single phase shifter for each optical mode is used rather than one phase shifter for each phase screen. This is possible because each of the matrices $D_V$, Σ, and $D_U$ are diagonal and therefore commute. Thus, the value of each phase shifter of the second matrix implementation 303 of the photonic processor 103 is the result of the product of the two phase screens: $D_V D_U$.

Figure 4:
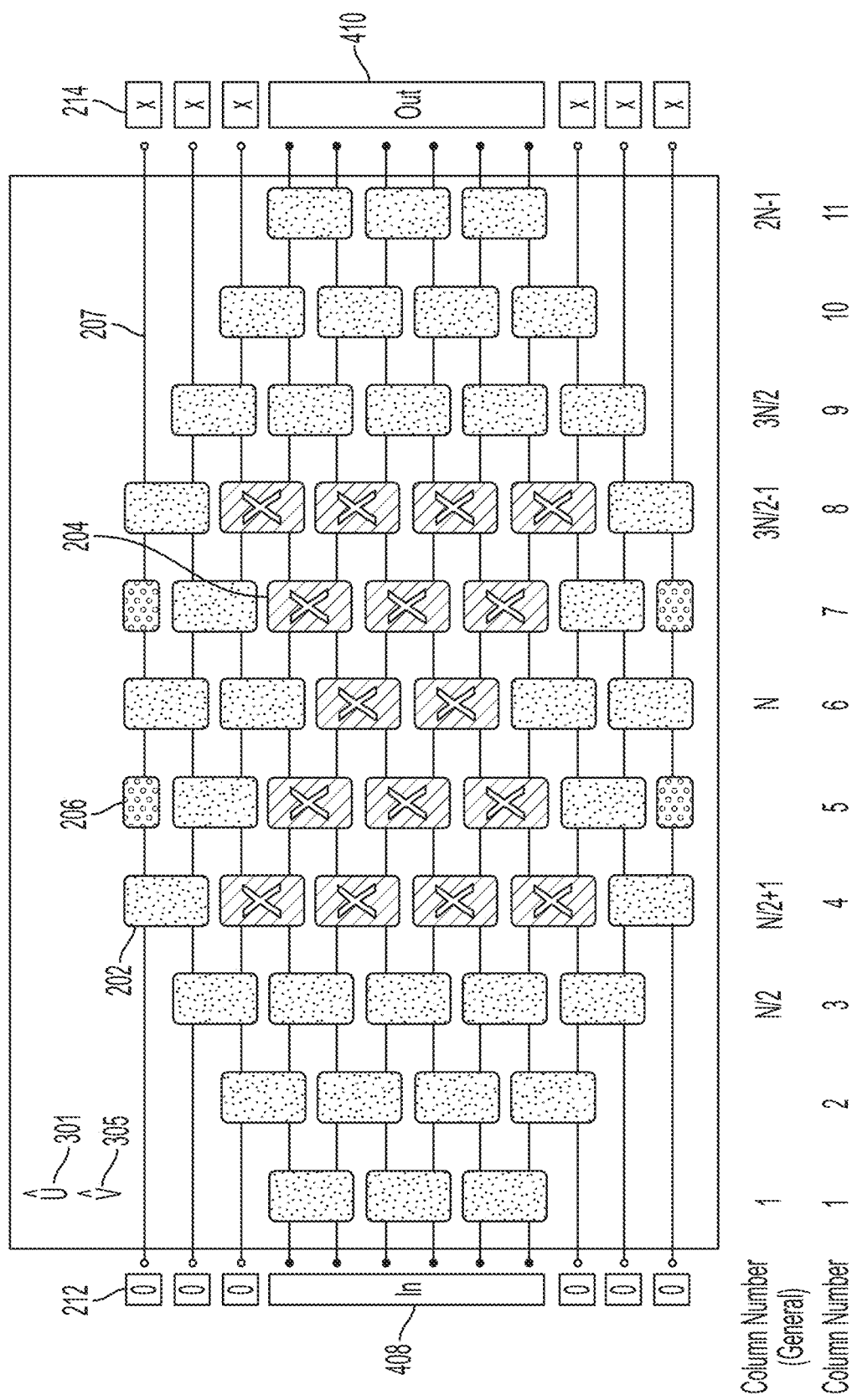
FIG. 4 is a schematic diagram illustrating a path-balanced optical network for use in the photonic processor of FIG. 3, in accordance with some embodiments of the technology described herein.

Referring to FIG. 4, a path-balanced optical network (e.g., optical network 200 of FIG. 2A or any of optical networks 500a-500e of FIGS. 5A-5E) may be used as the first matrix implementation 301 and/or the third matrix implementation 305 of photonic processor 103 of the example of FIG. 3, in accordance with some embodiments of the technology described herein. In the example of FIG. 4, optical network 200 has been depicted as the first matrix implementation 301 and/or the third matrix implementation 305.

In such embodiments, it may be appreciated that the signals received by input optical modes 408 and output optical modes 410 are not the same as the input optical modes 208 and output optical modes 210 of the example of FIG. 2A. Rather, in the case of first matrix implementation 301, the input optical modes 408 may receive input optical signals representing an input vector from optical encoder 101. In the case of the third matrix implementation 305, the input optical modes 408 may receive input optical signals representing the matrix-vector product Σ'y from the second matrix implementation 303, where y=Ûv is the output from the first matrix implementation 301. The first matrix implementation 301 may output optical signals representing a first vector-matrix product of the input vector and the matrix Û on the output optical modes 410. The third matrix implementation 305 may output optical signals representing a final matrix-vector product Av of the input vector v and the matrix A implemented by the photonic processor 103.

FIGS. 5A through 5E depict alternative examples of path-balanced optical networks which may be used as a photonic processor (e.g., photonic processor 103 of FIG. 1) or as matrix implementations within a photonic processor (e.g., first and/or third matrix implementations 301 and 305 of FIG. 4), in accordance with some embodiments of the technology described herein.

Figure 5A:
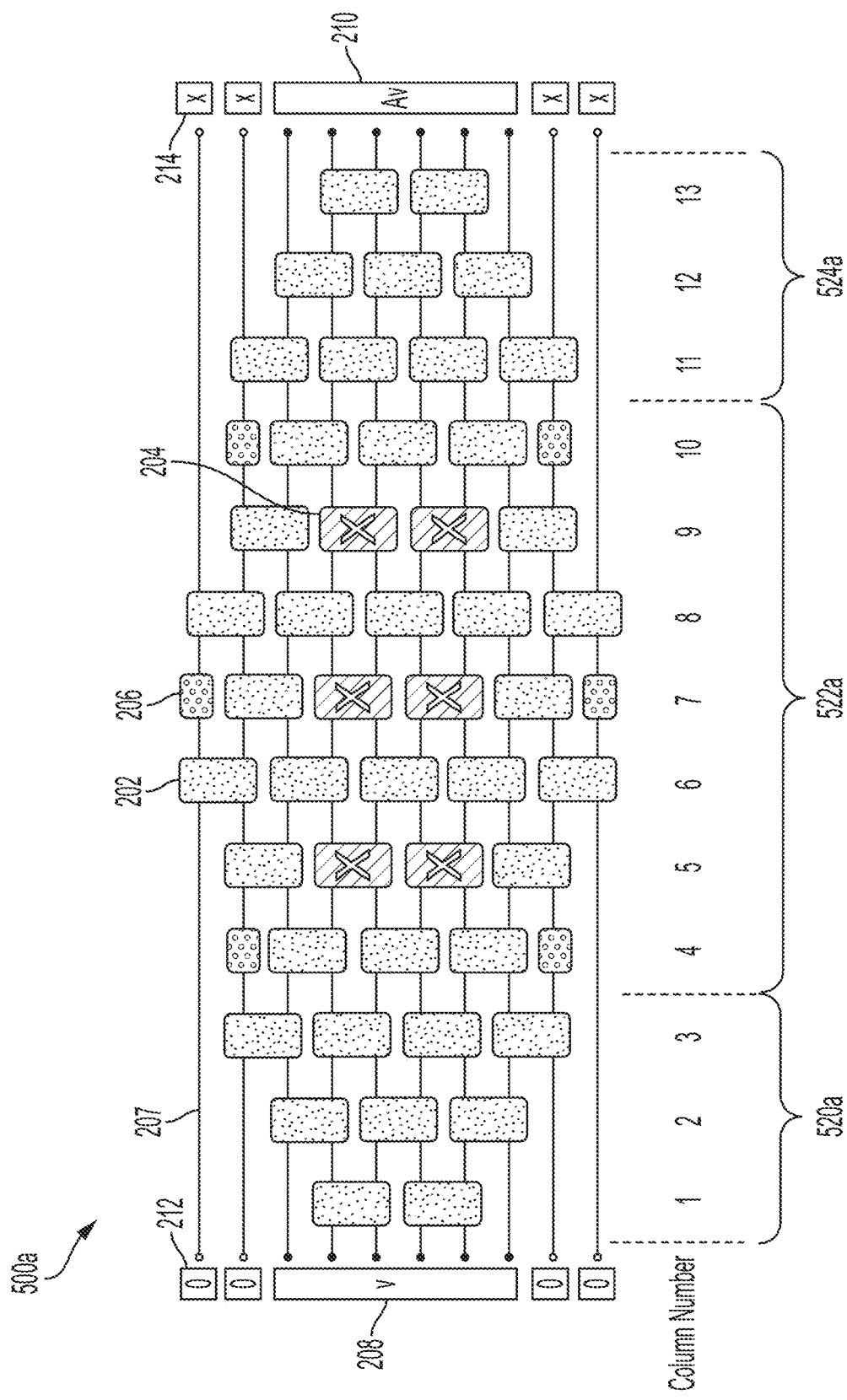
FIGS. 5A-5E are schematic diagrams illustrating alternative optical networks for use as a photonic processor as in FIG. 2A or for use in the photonic processor of FIG. 3, in accordance with some embodiments of the technology described herein.

FIG. 5A depicts a schematic of an example optical network 500a, in accordance with some embodiments of the technology described herein. The example of optical network 500a of FIG. 5A includes N=6 input optical modes 208 and P−N=4 free input optical modes 212. It may be appreciated that optical network 500a may be expanded for any value of N, in some embodiments. Optical network 500a includes a symmetric number of output optical modes 210 and free output optical modes 214. The photonic mesh of optical network 500a therefore spans greater than N optical modes, but spans fewer than 2N optical modes, in contrast with optical network 200 of FIG. 2A.

In some embodiments of optical network 500a, the input section 520a and output section 524a may follow a same pattern as the input section 220 and output section 224 of optical network 200. The middle section 522a, however, may contain a mixture of active optical components 202 and passive optical components 204 such that the passive optical components 204 do not form a contiguous region, as depicted in the example of FIG. 2A. Rather, the passive optical components 202 may be disposed in alternating columns within the middle section 522a, in some embodiments.

Figure 5B:
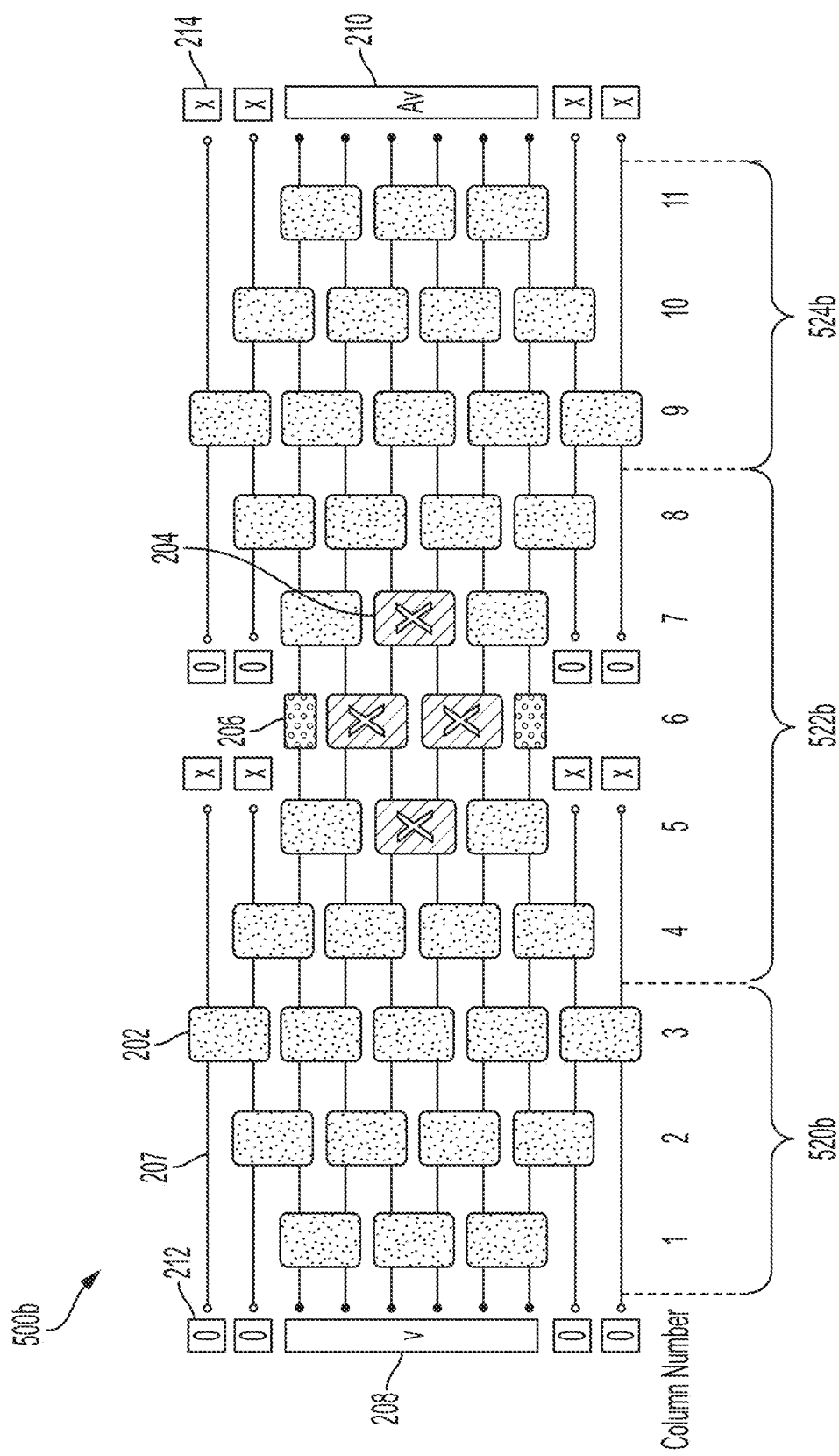

FIG. 5B depicts a schematic of another example optical network 500b, in accordance with some embodiments of the technology described herein. The example optical network 500b of FIB. 5B includes N=6 input optical modes 208 and P−N=4 free input optical modes 212. It may be appreciated that optical network 500b may be expanded for any value of N, in some embodiments. Optical network 500b includes a symmetric number of output optical modes 210 and free output optical modes 214. The photonic mesh of optical network 500b therefore spans greater than N optical modes, but spans fewer than 2N optical modes, in contrast with optical network 200 of FIG. 2A.

In some embodiments of optical network 500b, the input section 520b and output section 524b may follow a same pattern as the input section 220 and output section 224 of optical network 200. The middle section 522b, however, may follow a different pattern than middle section 222 of optical network 200. The middle section 522b may, in some embodiments, decrease by one the number of optical components in each column starting with the first column of the middle section 522b (column number four, in the example of FIG. 5B). The passive optical components 204 may increase in number by one in each subsequent column thereafter such that column number N comprises only passive optical components 204 and no active optical components 202. In the depiction of FIG. 5B, column number N is shown as including optional linking optical components 206, but in some embodiments linking optical components 206 may not be present. After column number N, the number of optical components per column may increase by one while the number of passive optical components 204 may decrease by one per column until the last column of middle section 522b comprises only active optical components.

Figure 5C:
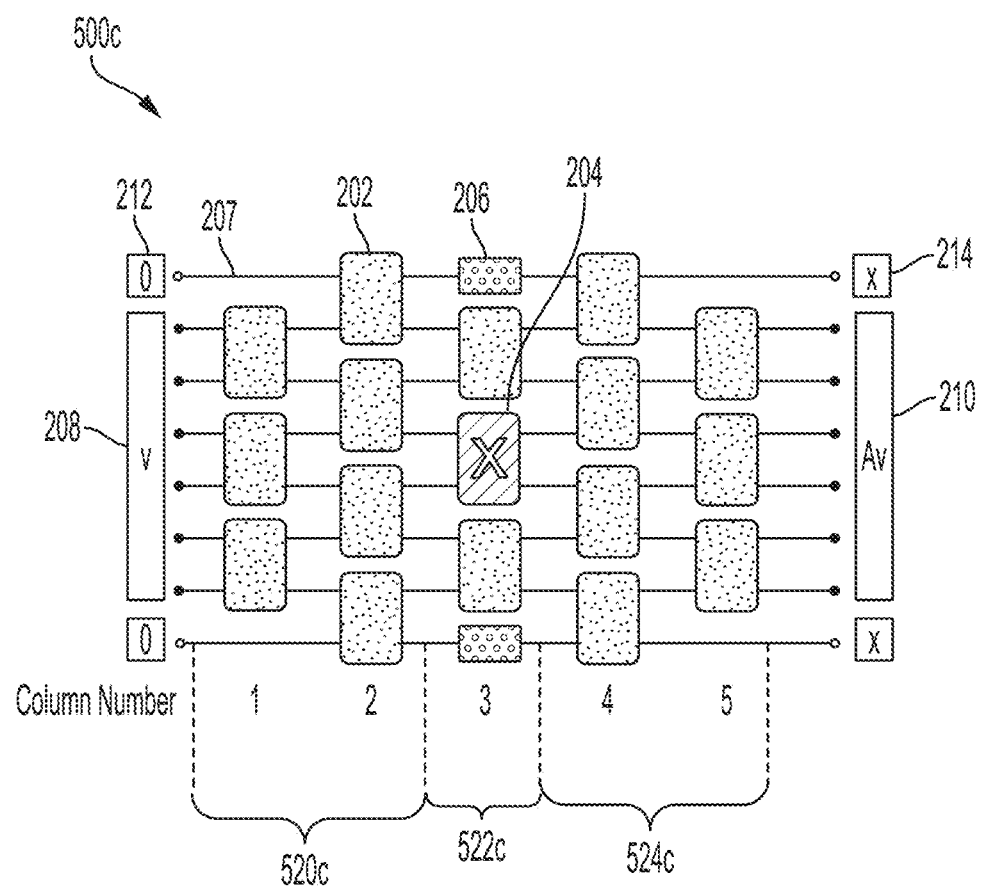

FIG. 5C depicts a schematic of an example optical network 500c, in accordance with some embodiments of the technology described herein. The example optical network 500c of FIG. 5C includes N=6 input optical modes 208 and P−N=2 free input optical modes 212. It may be appreciated that optical network 500c may be expanded for any value of N, in some embodiments. Optical network 500c includes a symmetric number of output optical modes 210 and free output optical modes 214. The photonic mesh of optical network 500a therefore spans N+2 optical modes, in contrast with optical network 200 of FIG. 2A and optical networks 500a, 500b of FIGS. 5A and 5B. Furthermore, the photonic mesh comprises fewer than $N^2$ active multi-port optical components, thereby limiting the photonic mesh to program a more restricted set of matrices.

Figure 5D:
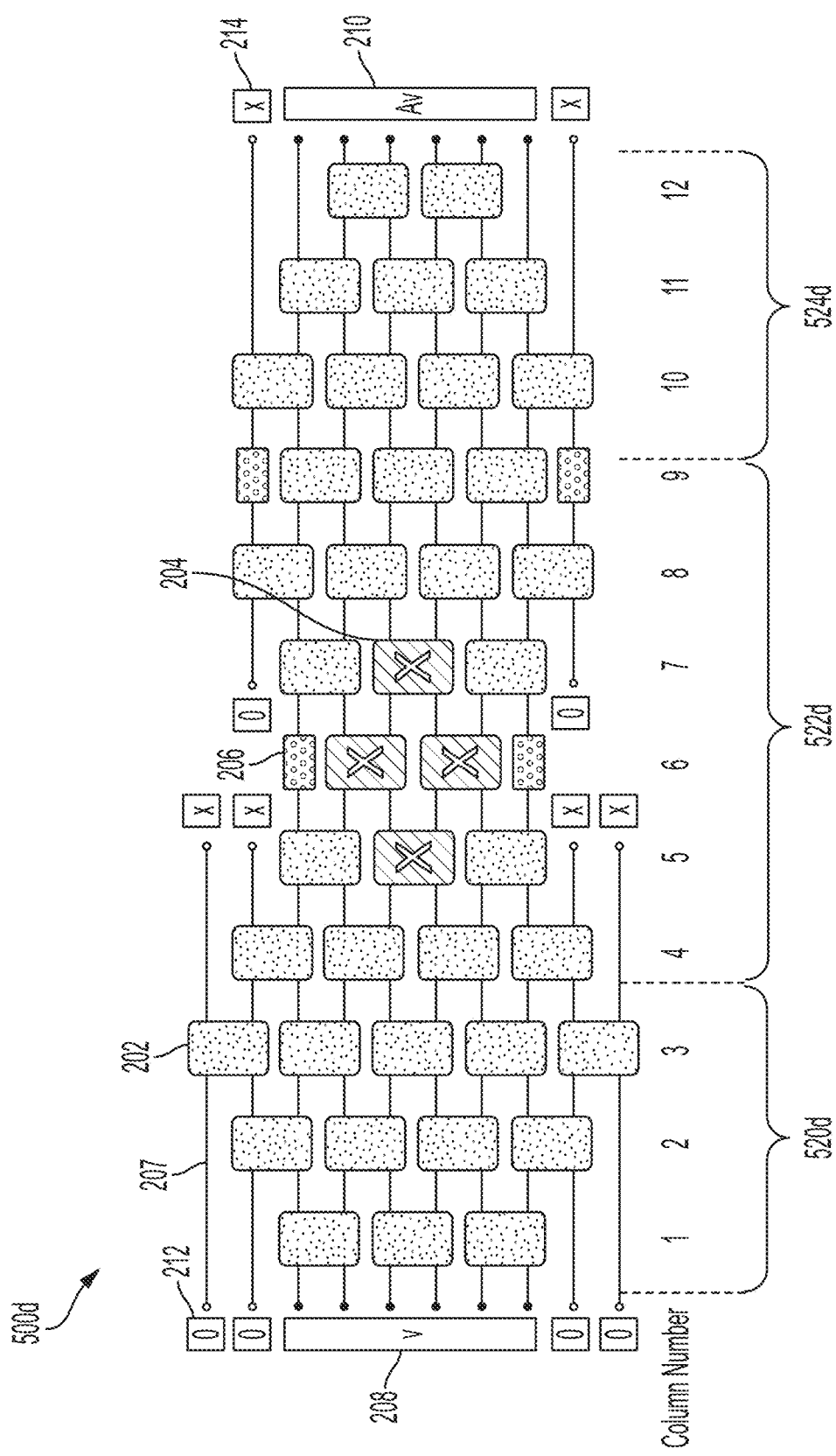

FIG. 5D depicts a schematic of an example optical network 500d, in accordance with some embodiments of the technology described herein. The example optical network 500d of FIG. 5D includes N=6 input optical modes 208 and P−N=4 free input optical modes 212. It may be appreciated that optical network 500d may be expanded for any value of N, in some embodiments. Optical network 500d includes a symmetric number of output optical modes 210 and free output optical modes 214. However, optical network 500d is arranged with an asymmetric structure from left-to-right.

In some embodiments of optical network 500d, the input section 520d and output section 524d may follow a same pattern as the input section 220 and output section 224 of optical network 200. The middle section 522d, however, may follow a different pattern than middle section 222 of optical network 200. The middle section 522d may, in some embodiments, be asymmetric from left-to-right. The middle section 522d may follow a same pattern as the middle section 522b of optical network 500b from column number N/2+1 to column number 3N/2−1 (e.g., from column number four to column number eight of the example of FIG. 5D). The middle section 522d may insert additional columns (e.g., column number nine of the example of FIG. 5D) after column number N/2+1 and prior to the beginning of output section 524d.

Figure 5E:
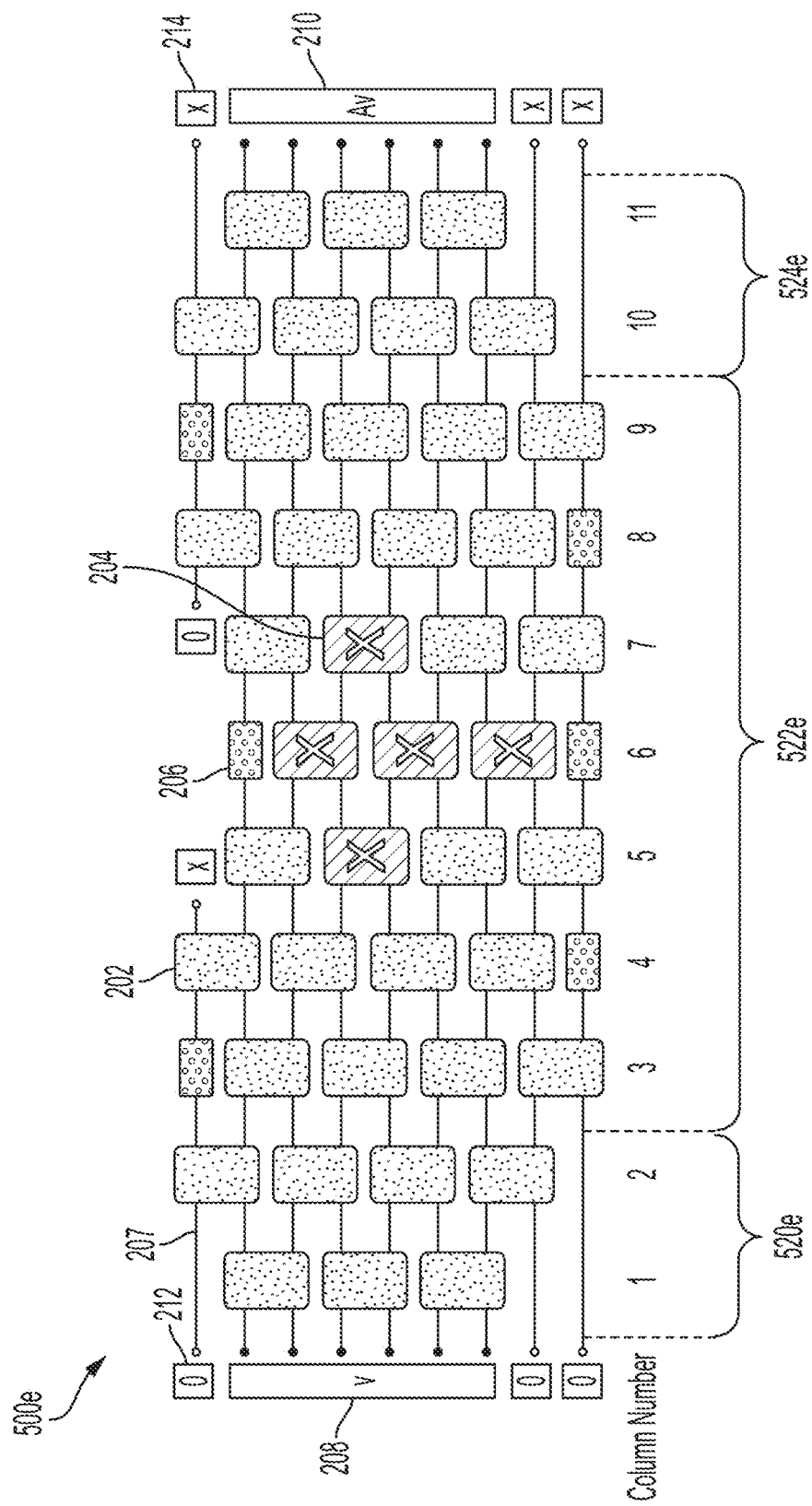

FIG. 5E depicts a schematic of an example optical network 500e, in accordance with some embodiments of the technology described herein. The example optical network 500e of FIG. 5E includes N=6 input optical modes 208 and P−N=3 free input optical modes 212. It may be appreciated that optical network 500e may be expanded for any value of N, in some embodiments. Optical network 500d includes a symmetric number of output optical modes 210 and free output optical modes 214. However, optical network 500d is arranged with an asymmetric structure from top-to-bottom.

In some embodiments of optical network 500e, the input section 520e and output section 524e may follow a same but truncated (e.g., including one less column) pattern as the input section 220 and output section 224 of optical network 200. The middle section 522e, however, may follow a different pattern than middle section 222 of optical network 200. The middle section 522e may, in some embodiments, be asymmetric from top-to-bottom. The middle section 522e may follow a similar pattern as the middle section 522b of optical network 500b from column number N−1 to column number N+1 (e.g., from column number five to column number seven of the example of FIG. 5E). However, the middle section 522e may include additional passive optical components 204 in column number N to accommodate for the asymmetric distribution of optical modes within the photonic mesh.

Figure 6:
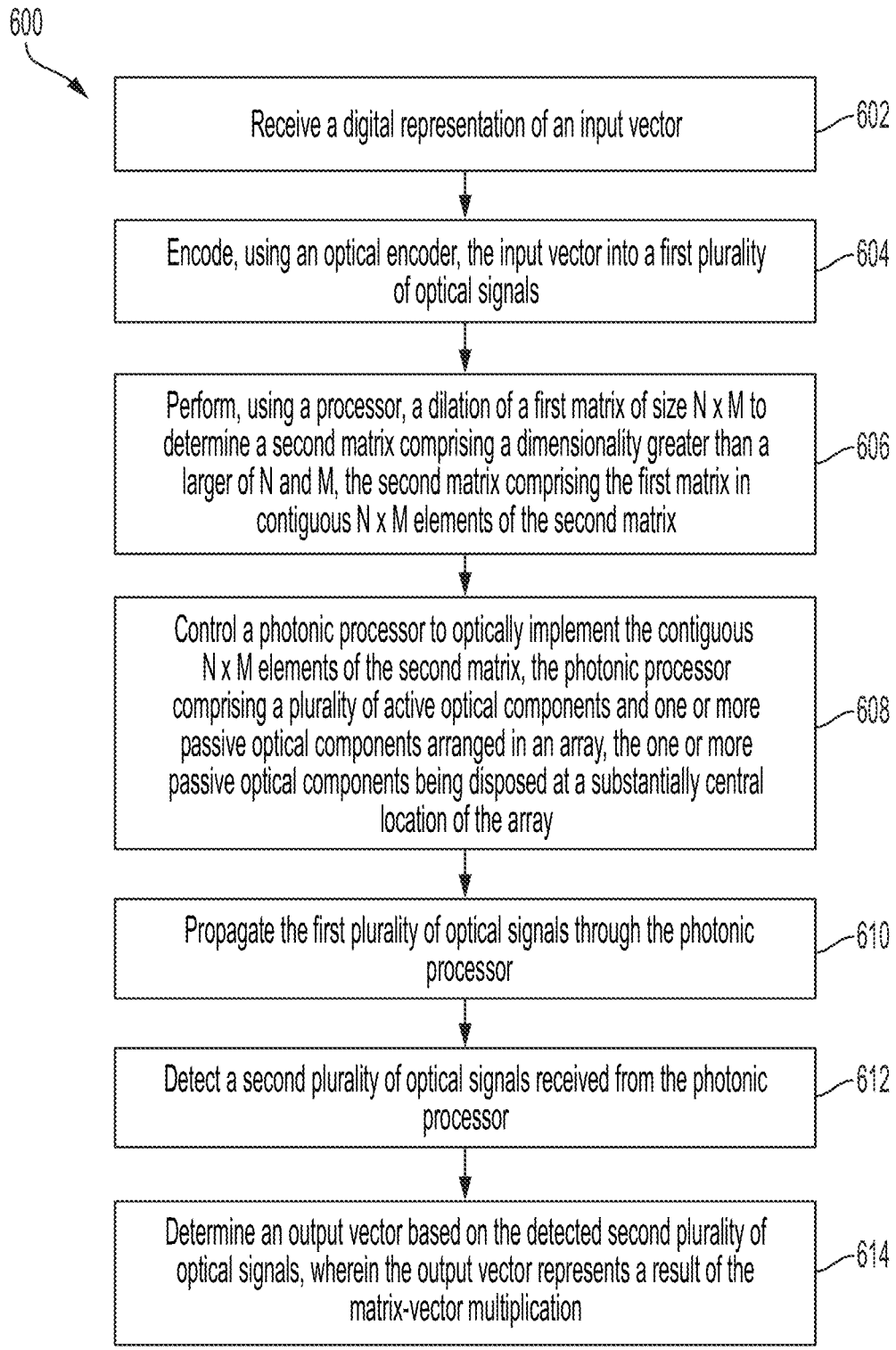
FIG. 6 is a flowchart illustrating a method of performing matrix-vector multiplication using a path-balanced optical network, in accordance with some embodiments of the technology described herein.

FIG. 6 illustrates a method 600 of performing a matrix-vector multiplication operation using a path-balanced optical network (e.g., any of optical networks 200 or 500a-500e), in accordance with some embodiments of the technology described herein.

In act 602, the optical encoder may receive a digital representation of an input vector, in accordance with some embodiments of the technology described herein. The digital representation may be provided to an optical encoder (e.g., optical encoder 101) by a controller (e.g., controller 107).

In act 604, the optical encoder may encode the input vector into a first plurality of optical signals, in accordance with some embodiments of the technology described herein. In some embodiments, an element of the input vector may be encoded into an optical signal of the first plurality of optical signals. For example, a complex number may be encoded into the intensity and phase of an optical signal of the first plurality of optical signals.

In act 606, a processor (e.g., processor 111 of controller 107) may perform a dilation of a first matrix of size N×M to determine a second matrix, in accordance with some embodiments of the technology described herein. The second matrix may be larger than the first matrix (e.g., the second matrix may have a size greater than a maximum of the values of N and M). The N×M elements of the first matrix may be stored in contiguous N×M elements of the second matrix. In some embodiments, the N×M elements of the first matrix may be stored in the center N×M elements of the second matrix, but the N×M elements need not be centered in the second matrix in all embodiments.

In act 608, the photonic processor (e.g., formed of optical network 200 and/or any of 500a-500e) may be controlled (e.g., by controller 107) to optically implement the contiguous N×M elements of the second matrix, in accordance with some embodiments of the technology described herein. The photonic processor may comprise a plurality of active optical components (e.g., active optical components 202) and one or more passive optical components (e.g., passive optical components 204) arranged in an array. In some embodiments, the passive optical components may be arranged at a substantially central location of the array (e.g., at a center of the array, within N/2 columns of a center column of the array, and/or distributed within a middle section of the array (e.g., middle section 222 or 522a-522e)). As described above, the N×M elements of the second matrix may be implemented by the active optical components of the array.

In act 610, the first plurality of optical signals may be propagated through the photonic processor, in accordance with some embodiments of the technology described herein. Propagating the first plurality of optical signals through the photonic processor may include having the first plurality of optical signals coherently interfering with one another and/or with the elements of the second matrix implemented in the photonic processor in a way that implements a matrix-vector product.

In act 612, a second plurality of optical signals may be output by the photonic processor and be detected by an optical detector (e.g., optical receiver 105), in accordance with some embodiments of the technology described herein. The second plurality of optical signals may correspond to the matrix-vector product of the input vector and the second matrix implemented in the photonic processor. The optical detector may use phase-sensitive or phase-insensitive detectors.

In act 614, an output vector may be determined based on the detected second plurality of optical signals, where the output vector may represent a result of the matrix-vector multiplication performed by the photonic processor, in accordance with some embodiments of the technology described herein. In some embodiments, a bit string representing the output vector may be returned to controller 107. In some embodiments, the detection results are used to determine a new input bit string to be encoded and propagated through the system. In this way, multiple calculations may be performed in serial where at least one calculation is based on the results of a previous calculation result.

Figure 7:
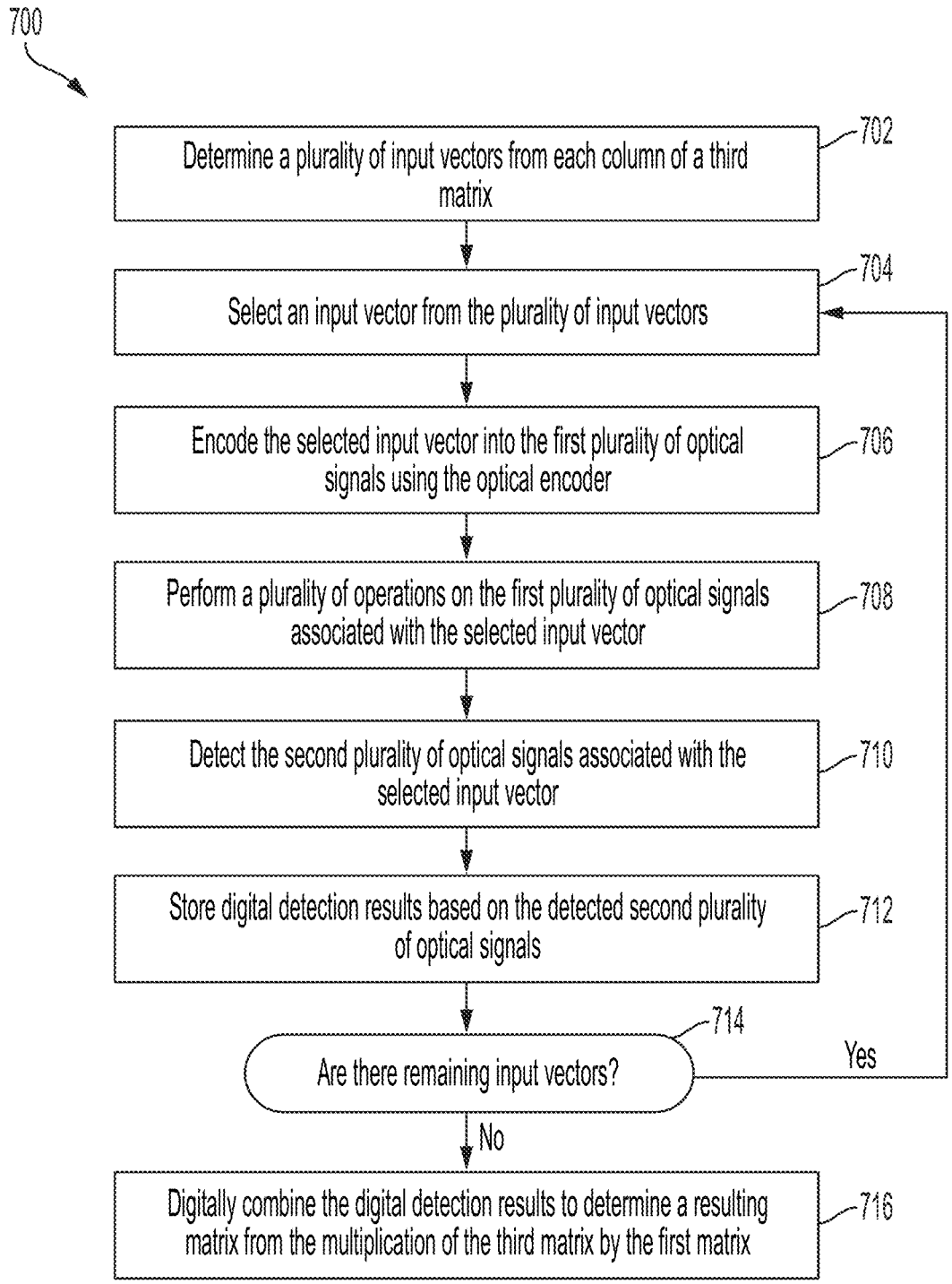
FIG. 7 is a flowchart illustrating a method of performing matrix-matrix multiplication using a path-balanced optical network, in accordance with some embodiments of the technology described herein.

FIG. 7 illustrates a method 700 of performing a matrix-matrix multiplication operation using a path-balanced optical network (e.g., any of optical networks 200 or 500a-500e), in accordance with some embodiments of the technology described herein.

In act 702, a plurality of input vectors may be determined from each column of a third matrix, in accordance with some embodiments of the technology described herein. The plurality of input vectors may be determined, for example, by controller (e.g., controller 107).

In act 704, an input vector may be selected from the plurality of input vectors, in accordance with some embodiments of the technology described herein. The input vector may be selected by, for example, the controller (e.g., controller 107).

In act 706, the selected input vector may be encoded into a first plurality of optical signals by the optical encoder, in accordance with some embodiments of the technology described herein. The selected input vector may be provided to the optical encoder (e.g., optical encoder 101) by the controller (e.g., controller 107). The optical encoder may then encode the selected input vector into a first plurality of optical signals. In some embodiments, an element of the input vector may be encoded into an optical signal of the first plurality of optical signals. For example, a complex number may be encoded into the intensity and phase of an optical signal of the first plurality of optical signals.

In act 708, a plurality of operations may be performed on the first plurality of optical signals associated with the selected input vector, in accordance with some embodiments of the technology described herein. The plurality of operations may be performed on the first plurality of optical signals by propagating the first plurality of optical signals through a photonic processor (e.g., any of optical networks 200 or 500a-500e). The first plurality of optical signals may coherently interfere with one another and/or the matrix implemented by the photonic processor to produce a second plurality of optical signals representing a matrix-vector product of the selected input vector and the first matrix implemented by the photonic processor.

In act 710, a second plurality of optical signals may be detected, in accordance with some embodiments of the technology described herein. The second plurality of optical signals may correspond to the matrix-vector product of the input vector and the second matrix implemented in the photonic processor. The second plurality of optical signals may be detected by an optical receiver (e.g., optical receiver 105). The optical receiver may use phase-sensitive or phase-insensitive detectors.

In act 712, digital detection results based on the second plurality of optical signals may be stored, in accordance with some embodiments of the technology described herein. The digital detection results may be stored by the controller (e.g., controller 107) in a computer-readable storage medium (e.g., memory 109) for later use.

In act 714, it may be determined whether there are any remaining input vectors in the third matrix, in accordance with some embodiments of the technology described herein. The determination may be performed by the controller (e.g., controller 107). If the controller determines that there are remaining input vectors to be propagated through the photonic processor, the process returns to act 704. Otherwise, the process proceeds to act 716.

In act 716, if it has been determined that there are no remaining input vectors in the third matrix, the digital detection results may be digitally combined to determine a resulting matrix from the multiplication of the third matrix by the first matrix, in accordance with some embodiments of the technology described herein. The controller (e.g., controller 107) may perform the digital combination of the digital detection results. In some embodiments, the detection results may be used to determine a new matrix to be implemented through the photonic processor. In this way, multiple calculations may be performed in serial where at least one calculation is based on the results of a previous calculation result.

Figure 8:
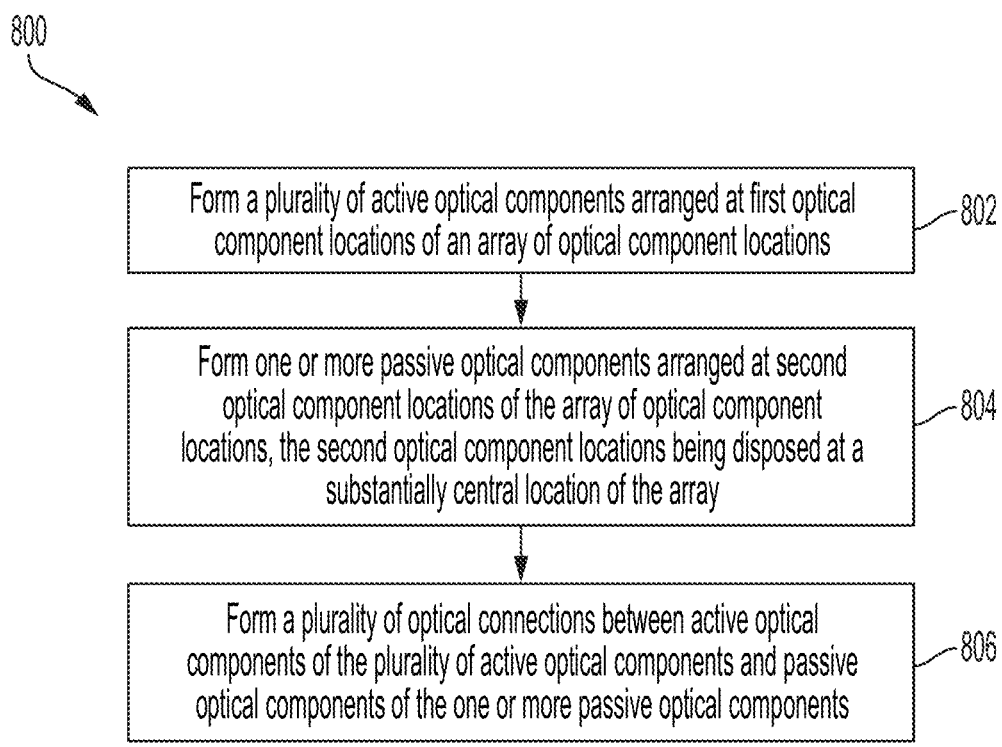
FIG. 8 is a flowchart illustrating a method of manufacture of a path-balanced optical network, in accordance with some embodiments of the technology described herein.

FIG. 8 illustrates a method 800 of manufacturing a path-balanced optical network (e.g., any of optical networks 200 or 500a-500e), in accordance with some embodiments of the technology described herein. Embodiments of the path-balanced optical networks may be manufactured using conventional semiconductor manufacturing techniques. For example, waveguides, active optical components, and passive optical components may be formed in a substrate using conventional deposition, masking, etching, and/or doping techniques.

In act 802, a plurality of active optical components may be formed, in accordance with some embodiments of the technology described herein. The active optical components may be formed using, e.g., conventional semiconductor manufacturing techniques. The active optical components (e.g., active optical components 202) may be arranged at first optical component locations of an array of optical component locations.

In act 804, one or more passive optical components may be formed, in accordance with some embodiments of the technology described herein. The passive optical components may be formed using, e.g., conventional semiconductor manufacturing techniques. The passive optical components (e.g., passive optical components 204) may be arranged at second optical component locations of the array of optical component locations. The second optical component locations may be disposed at a substantially central location of the array.

In act 806, a plurality of optical connections may be formed between active optical components of the plurality of active optical components and passive optical components of the one or more passive optical components, in accordance with some embodiments of the technology described herein. In some embodiments, the plurality of optical connections may be, for example, photonic waveguides (e.g., silicon waveguides). The plurality of optical connections may be formed using, e.g., conventional semiconductor manufacturing techniques.

Having thus described several aspects of at least one embodiment of this technology, it is to be appreciated that various alterations, modifications, and improvements will readily occur to those skilled in the art.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure described above. The computer-readable medium or media may be transportable, such that the program or programs stored thereon may be loaded onto one or more different computers or other processors to implement various aspects of the present disclosure as described above.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format. As another example, a computing device may receive input from a camera, lidar, or other device that produces visual data.

Embodiments of a computing device may also include a photonic processor, such as the one described herein. The processor of the computing device may send and receive information to the photonic processor via one or more interfaces. The information that is sent and received may include settings of the detectors of the photonic processor and/or measurement results from the detectors of the photonic processor.

The terms "program" or "software" are used herein to refer to any type of computer code or set of computer-executable instructions that may be employed to program one or more processors to implement various aspects of the present disclosure as described above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, examples of which are provided herein including with reference to FIGS. 6 and 7. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A programmable optical network for representing a first matrix of size N×M, the programmable optical network comprising:
   an array of optical component locations;
   a plurality of optical modes optically coupled to the array of optical component locations, the plurality of optical modes comprising P optical modes, where P is a value greater than a larger of N and M;
   a plurality of active optical components arranged at first optical component locations of the array of optical component locations;
   one or more passive optical components arranged at second optical component locations of the array of optical component locations, the second optical component locations being disposed at a substantially central location of the array, and
   wherein the first matrix is embedded in a second matrix within the programmable optical network, the second matrix comprising a dimensionality greater than a larger of N and M.

2. The programmable optical network of claim 1, wherein N=M.

3. The programmable optical network of claim 1, wherein a first one of the plurality of active optical components comprises a coupler between two or more optical modes.

4. The programmable optical network of claim 1, wherein a first one of the one or more passive optical components implements a swap operation.

5. The programmable optical network of claim 2, wherein the second matrix is a 2N×2N unitary matrix.

6. The programmable optical network of claim 1, wherein the array comprises:
   an input section;
   a middle section; and
   an output section, wherein:
      the middle section comprises active optical components of the plurality of active optical components and at least one of the one or more passive optical components.

7. The programmable optical network of claim 6, wherein the array is arranged as an octagonal array and N=M.

8. The programmable optical network of claim 7, wherein:
   the octagonal array comprises 2N−1 columns,
   the input section comprises N/2 columns of the octagonal array, wherein a first column of the input section comprises N/2 optical component locations, each subsequent column thereafter comprises an increasing number of optical component locations, and column N/2 comprises N−1 optical component locations,
   the middle section comprises N−1 columns of the octagonal array, the N−1 columns extending from column number N/2+1 to column number 3N/2−1, wherein column number N/2+1 and column number 3N/2−1 each comprises N optical component locations, and wherein each column therebetween alternatingly comprises N−1 optical component locations or N optical component locations, and
   the output section comprises N/2 columns of the octagonal array, the N/2 columns extending from column number 3N/2 to column number 2N−1, wherein column number 3N/2 comprises N−1 optical component locations, each subsequent column thereafter comprises a decreasing number of optical component locations, and column number 2N−1 comprises N/2 optical component locations.

9. The programmable optical network of claim 8, wherein an active optical component of the plurality of active optical components is disposed at at least one optical component location of the input section and another active optical component of the plurality of active optical components is disposed at at least one optical component location of the output section.

10. The programmable optical network of claim 8, wherein at least one of the one or more passive optical components is arranged at one or more optical component locations within the middle section, wherein:
   column number N/2+1 comprises N−2 passive optical components and two active optical components,
   subsequent columns thereafter comprise a decreasing number of passive optical components,
   column number N comprises N/2−1 passive optical components and N/2+1 active optical components,
   subsequent columns thereafter comprise an increasing number of passive optical components, and
   column number 2N−1 comprises N−2 passive optical components and two active optical components.

11. The programmable optical network of claim 10, wherein at least one active optical component is disposed at either end of a column of the middle section.

12. The programmable optical network of claim 6, wherein:
   at least one active optical component of a first column of the input section is optically coupled to an optical source, and at least one active optical component of a last column of the output section is optically coupled to an optical receiver.

13. The programmable optical network of claim 12, further comprising:
- M free inputs optically coupled to topmost and bottommost optical component locations of the input section; and
- N free outputs optically coupled to topmost and bottommost optical component locations of the output section.

14. The programmable optical network of claim 1, wherein the plurality of active optical components comprises at least NM active optical components.

* * * * *